US011858403B1

(12) United States Patent
Farmer et al.

(10) Patent No.: US 11,858,403 B1
(45) Date of Patent: Jan. 2, 2024

(54) CONVERTIBLE RAMP BODY FOR USE WITH VEHICLES HAVING CARGO BEDS, A COMBINATION VEHICLE AND CONVERTIBLE RAMP BODY, AND/OR A METHOD OF LOADING ROLLING TOOLS INTO A CARGO BED OF A VEHICLE USING A CONVERTIBLE RAMP BODY

(71) Applicants: Wyatt Taft Farmer, Cavetown, MD (US); Luke Waesche, Sabillasville, MD (US)

(72) Inventors: Wyatt Taft Farmer, Cavetown, MD (US); Luke Waesche, Sabillasville, MD (US)

( * ) Notice: Subject to any disclaimer, the term of this patent is extended or adjusted under 35 U.S.C. 154(b) by 457 days.

(21) Appl. No.: 16/893,783

(22) Filed: Jun. 5, 2020

Related U.S. Application Data

(60) Provisional application No. 62/858,175, filed on Jun. 6, 2019.

(51) Int. Cl.
*B60P 1/43* (2006.01)

(52) U.S. Cl.
CPC ................... *B60P 1/435* (2013.01)

(58) Field of Classification Search
CPC .. B60P 1/435; B60P 1/003; B60P 3/40; B62D 33/023; B62D 33/0273; B60R 5/041; B60R 9/06
USPC ................. 296/61, 26.08, 24.44, 3
See application file for complete search history.

(56) References Cited

U.S. PATENT DOCUMENTS

| | | | |
|---|---|---|---|
| 2,808,291 A | 10/1957 | Meter | |
| 3,989,148 A | 11/1976 | Donohue | |
| 4,199,186 A | 4/1980 | Faverino | |
| 5,518,288 A | 5/1996 | Deklotz | |
| 5,752,800 A * | 5/1998 | Brincks | B60P 3/40 296/26.11 |
| 5,772,271 A | 6/1998 | Sanders | |
| 5,816,638 A * | 10/1998 | Pool, III | B62D 33/0273 296/26.11 |
| 5,924,835 A | 7/1999 | Ross | |
| 6,076,215 A * | 6/2000 | Blankenship | B60P 1/43 14/71.1 |
| 6,386,819 B1 * | 5/2002 | Schultz | B60P 1/43 296/61 |
| 6,533,337 B1 * | 3/2003 | Harshman | B60P 3/07 224/403 |
| 6,536,822 B1 | 5/2003 | Vagedes | |
| 6,557,917 B1 * | 5/2003 | Colcombe | B60J 10/17 224/403 |
| 7,070,220 B1 * | 7/2006 | Lantaigne | B60R 9/06 296/26.11 |
| 7,434,858 B1 * | 10/2008 | Lastinger | B60P 3/002 296/3 |

(Continued)

*Primary Examiner* — Jason S Morrow
*Assistant Examiner* — Wenwei Zhuo
(74) *Attorney, Agent, or Firm* — GARCIA-ZAMOR INTELLECTUAL PROPERTY LAW, LLC; Ruy Garcia-Zamor

(57) ABSTRACT

A convertible ramp body and/or combination of vehicle with a cargo bed and convertible ramp body wherein the convertible ramp body may be positioned about the cargo bed of a vehicle. The convertible ramp body may include a storage shelf body and cargo bed extender on opposite lateral ends of the cargo bed and connected by sidewall beams and a ramp pivotally connected to the cargo bed extender.

16 Claims, 27 Drawing Sheets

(56) References Cited

U.S. PATENT DOCUMENTS

Figure 1:
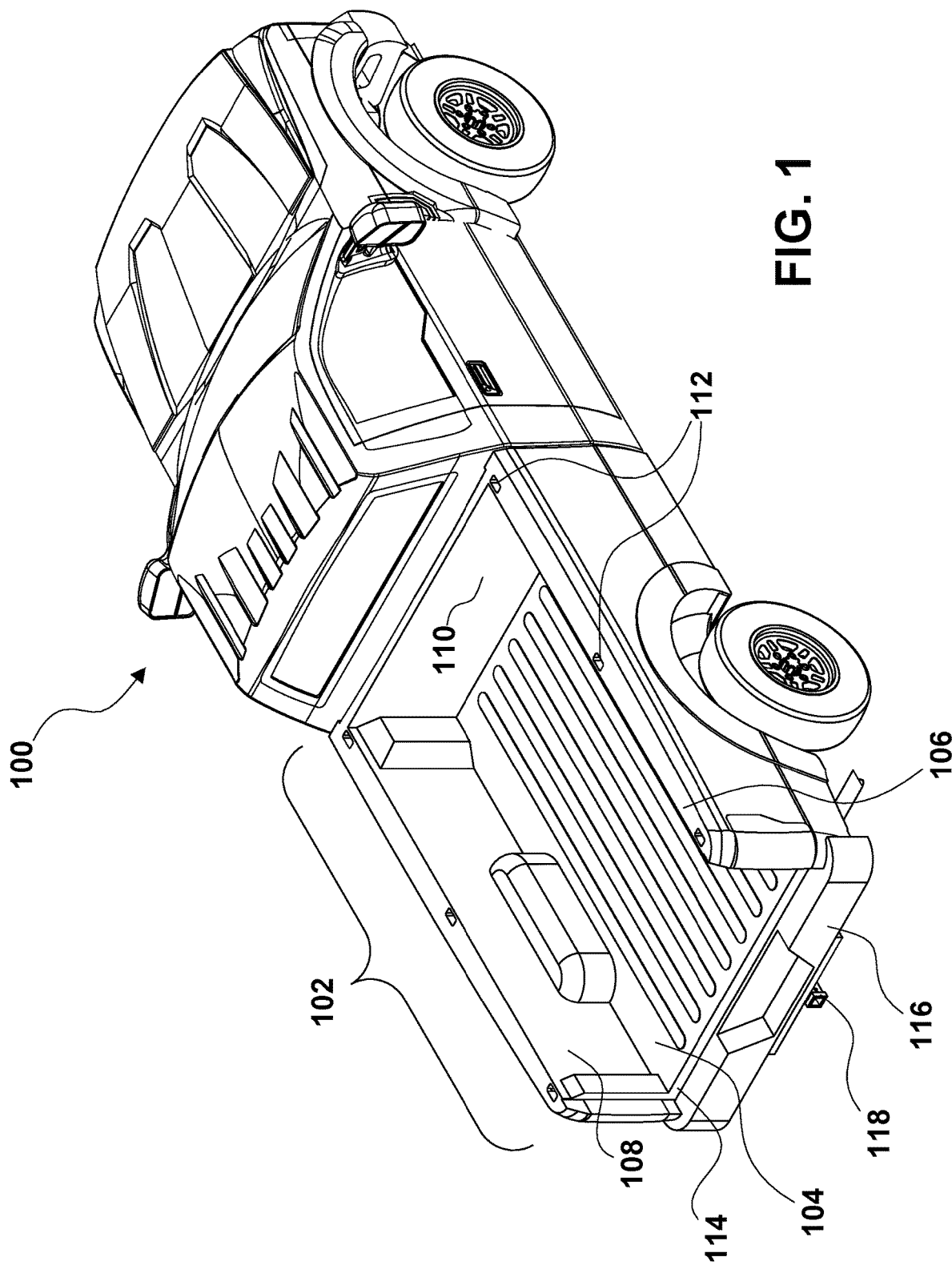

| | | | | |
|---|---|---|---|---|
| 7,503,742 | B2 * | 3/2009 | Smith, Jr. | B60P 1/431 |
| | | | | 414/537 |
| 8,061,754 | B1 * | 11/2011 | Webb | B60P 3/122 |
| | | | | 296/61 |
| 8,882,436 | B2 * | 11/2014 | Kramlick | B60P 3/07 |
| | | | | 414/537 |
| 9,656,586 | B2 | 5/2017 | Moorman | |
| 2010/0032918 | A1 * | 2/2010 | Chamoun | B62D 63/061 |
| | | | | 280/30 |
| 2013/0175820 | A1 * | 7/2013 | Lepage | B60P 3/40 |
| | | | | 296/26.08 |
| 2016/0129824 | A1 * | 5/2016 | Adriani | B60P 1/435 |
| | | | | 29/401.1 |
| 2016/0137117 | A1 * | 5/2016 | Parrish | B60P 1/435 |
| | | | | 414/537 |

* cited by examiner

CONVERTIBLE RAMP BODY FOR USE WITH VEHICLES HAVING CARGO BEDS, A COMBINATION VEHICLE AND CONVERTIBLE RAMP BODY, AND/OR A METHOD OF LOADING ROLLING TOOLS INTO A CARGO BED OF A VEHICLE USING A CONVERTIBLE RAMP BODY

CROSS-REFERENCE TO RELATED APPLICATION

This application claims priority to U.S. Provisional Patent Application No. 62/858,175 filed on Jun. 6, 2019, which is incorporated by reference as if set forth in its entirety herein.

BACKGROUND

The present invention is directed generally vehicle accessories and, more specifically, accessories which may connect to the cargo beds of vehicles. More specifically still, the invention is directed toward a convertible ramp for use with the cargo beds of vehicles and a combination vehicle and convertible ramp body for adding a ramp to cargo beds.

Vehicles with cargo beds generally suffer from several deficiencies with incompatible solutions. Very large vehicles which have both cargo beds can pull up to stationary docking bays for loading large objects, debris, or large tools like riding tractors. Such vehicles are very large and accordingly very expensive and inefficient. Conversely, smaller vehicles with cargo beds may be cheaper, but are too small to use with a warehouse docking bay. This makes unloading and loading very difficult. In order to transport large tools like tractors or mowers, operators are often required to tow trailers behind such vehicles, such as pickup trucks, which decreases mobility and increases expenses, including fuel, fees for purchasing and licensing trailers, etc.

It may be advantageous to provide a convertible ramp body that at least one of: is detachable from and assembled about the cargo bed of a vehicle; does not directly overlay or cover any portion of the cargo bed floor; has a cargo bed extender that extends the effective area of the cargo bed; has a ramp that does not overlay or cover any part of the bed floor; is pivotally connected to the ramp; and adds storage without reducing any portion of the effective part of the cargo bed.

SUMMARY

Briefly speaking, one aspect of the present invention is directed to a combination of a vehicle and a convertible ramp body, wherein the vehicle has a cargo bed about which the convertible ramp body may be positioned. The cargo bed preferably has a bed floor with a perimeter. The convertible ramp body may have a cargo bed extender positioned adjacent to the cargo bed and ramp connected to the cargo bed extender by a pivotal connection to allow the ramp to rotate upward and downward there about.

In some aspects, the cargo bed extender may have a support panel, also referred to as a roll-off/dovetail portion, configured to increase the usable area of the cargo bed of the vehicle. When viewed in cross-section the support panel may have an arcuate curvature, one of the support panel ends being vertically closer to the ground than the other support panel end which is generally positioned a same vertical distance above the ground as the cargo bed of the vehicle. The convertible ramp body may also include a jack assembly, or jack, positioned under the dovetail. The jack assembly can be extended to contact the ground. When the ramp is lowered and locked into place, the jack can be extended, contacting the ground and lifting the dovetail/ramp portion from the rest of the unit. Allowing for the user to quickly remove/attach the dovetail and ramp portion as desired.

In a separate aspect, the present invention is directed to a combination of a vehicle and a convertible ramp body, wherein the vehicle has a cargo bed about which the convertible ramp body may be positioned. The cargo bed preferably has a bed floor with a perimeter. The convertible ramp body may have a cargo bed extender positioned adjacent to the cargo bed and ramp connected to the cargo bed extender by a pivotal connection to allow the ramp to rotate upward and downward there about. The cargo bed extender may have a support panel, also referred to as a roll-off portion, configured to increase an effective area of the cargo bed of the vehicle. When viewed in cross-section the support panel may have an arcuate curvature, one of the support panel ends being vertically closer to the ground than the other support panel end which is generally positioned a same vertical distance above the ground as the cargo bed of the vehicle. The convertible ramp body may also include a jack assembly, or jack, positioned on a side of the support panel. The jack assembly can be extended to contact the transfer surface. When the angular position of the ramp relative to the support panel is fixed in a lowered position and the jack is in contact with the transfer surface, the cargo bed extender is supported above the transfer surface by the ramp and the jack.

In some aspects, the cargo bed has a horizontal sidewall and a bed opening positioned on opposite axial ends of the cargo bed and a first lateral sidewall and a second lateral sidewall positioned on opposite lateral ends of the cargo bed such that these defined a perimeter of the cargo bed. The convertible ramp body may include a storage shelf body on one axial end positioned near, and above, the horizontal sidewall, and a cargo bed extender positioned on the opposite axial end such that the cargo bed extender is positioned adjacent to the bed opening. The cargo bed extender preferably includes a vertical support portion having a first flooring section and a roll-off portion having a second flooring section meeting at an angular connection. Preferably, the first flooring section increases an effective area of the bed floor and the second flooring section is angled downward relative to the first flooring section to better link the cargo bed extender to the ramp. It is preferred that no portion of the cargo bed extender is formed by the rear gate of the vehicle. The shelf body and cargo bed extender may be connected by a first sidewall beam, positioned over the first lateral sidewall, and a second sidewall beam, positioned over the second lateral sidewall. Preferably, the cargo bed extender and the storage shelf body are thus located on opposite ends of the first and second sidewall beams. The convertible ramp body may include a ramp connected to the cargo bed extender by a pivotal connection, allowing the ramp to rotate upward and downward about the pivotal connection. The convertible ramp body preferably does not adjacently overlay nor lay upon any portion of the bed floor when positioned about the cargo bed of the vehicle.

In a separate aspect, the invention may be direct to a cargo bed extender configured for increasing the effective area of a cargo bed of a vehicle to provide an expanded cargo bed. The cargo bed extender may include a support panel, or a roll-off portion, configured to be attached to the vehicle and to be positioned adjacent to and in general edge-to-edge alignment with the cargo bed of the vehicle. A ramp may be connected to the support panel of the cargo bed extender by a pivotal connection, allowing the ramp to rotate upward and downward about the pivotal connection such that the ramp is moveable between a lowered position in which the ramp contacts a support surface, such as the ground, and a fully upright, or blocking position, such that the ramp forms a gate for an end of the expanded cargo bed. When in the lowered position, or ground contacting position, the ramp can be positionally fixed relative to the support panel such that the ramp forms at least one support structure for the cargo bed extender. A jack assembly, or jack, may be positioned on a side of the roll-off portion, or support panel, which can be extended to contact the transfer surface, or ground, wherein when the ramp is fixed relative to the support panel in the lowered position and the jack is in contact with the transfer surface, the cargo bed extender is supported above the transfer surface, or the ground, by the ramp and the jack assembly. The support panel of the cargo bed extender, wherein when viewed in cross-section, may have an arcuate curvature, with a first support panel end being closer to the transfer surface than the second support panel end which is generally positioned a same vertical distance above the support surface as the cargo bed of the vehicle. Preferably, the height of the support panel may be generally unchanged whether the support panel is engaged with a vehicle or freestanding.

In a separate aspect, one aspect of the present invention is directed to a combination of a vehicle and a convertible ramp body, wherein the vehicle has a cargo bed about which the convertible ramp body may be positioned. The cargo bed preferably has a horizontal sidewall and a bed opening positioned on opposite axial ends of the cargo bed and a first lateral sidewall and a second lateral sidewall positioned on opposite lateral ends of the cargo bed such that these defined a perimeter of the cargo bed. The convertible ramp body may include a storage shelf body on one axial end positioned near, and above, the horizontal sidewall, and a cargo bed extender positioned on the opposite axial end such that the cargo bed extender is positioned adjacent to the bed opening. The cargo bed extender preferably includes a vertical support portion having a first flooring section and a roll-off portion having a second flooring section meeting at an angular connection. Preferably, the first flooring section increases an effective area of the bed floor and the second flooring section is angled downward relative to the first flooring section to better link the cargo bed extender to the ramp. It is preferred that no portion of the cargo bed extender is formed by the rear gate of the vehicle. The shelf body and cargo bed extender may be connected by a first sidewall beam, positioned over the first lateral sidewall, and a second sidewall beam, positioned over the second lateral sidewall. Preferably, the cargo bed extender and the storage shelf body are thus located on opposite ends of the first and second sidewall beams. The convertible ramp body may include a ramp connected to the cargo bed extender by a pivotal connection, allowing the ramp to rotate upward and downward about the pivotal connection. The convertible ramp body preferably does not adjacently overlay nor lay upon any portion of the bed floor when positioned about the cargo bed of the vehicle.

In some aspects, the combination may include first and second flooring sections on a cargo bed extender frame, with first and second sidewall extenders extending upward from the cargo bed extender frame along the first lateral and second sidewalls, respectively. In some aspects, the vehicle may include a towing bracket, and the convertible ramp body may include a towing bracket connector to connect the convertible ramp body to the vehicle. The towing bracket connector may include a spacer portion to elevate the cargo bed extender above the bumper of the vehicle, and an engagement portion configured to connect to the towing bracket. A pin may be provided to pass through a pin hole in the towing bracket and towing bracket connector, to detachably secure the latter within the former.

In a separate aspect, the convertible ramp body may include a storage shelf body on one axial end of the convertible ramp body and a cargo bed extender positioned on the opposite axial end. The cargo bed extender preferably includes a vertical support portion having a first flooring section and a roll-off portion having a second flooring section. The vertical support portion and roll-off portion may meet at an angular connection. The shelf body and cargo bed extender may be connected by a first sidewall beam on one lateral side and a second sidewall beam on the opposite lateral side. Preferably, the cargo bed extender and the storage shelf body are located on opposite ends of the first and second sidewall beams. The convertible ramp body preferably includes a ramp connected to the cargo bed extender by a pivotal connection, allowing the ramp to rotate upward and downward about the pivotal connection.

In some aspects, the storage shelf body may include a shelf frame which includes a plurality of shelf support posts and a shelf support arm to support a shelf flooring section. The shelf frame may further define first and second shelf sidewalls positioned on opposite lateral ends of the storage shelf body and a horizontal shelf sidewall positioned on an axial end of the storage shelf body farthest from the cargo bed extender. The shelf support arm may be positioned on the opposite axial end of the storage shelf body as the horizontal shelf sidewall such that items positioned on the shelf flooring section could only fall into a cargo bed when the convertible ramp body is positioned about the cargo bed of a vehicle. A combination of a vehicle and a convertible ramp body, wherein:

In a separate aspect, the present invention may be directed to a combination vehicle and cargo bed extender. The vehicle may include a cargo bed which includes a bed floor with a perimeter. The convertible ramp body may include a cargo bed extender that can be positioned generally adjacent to a rear edge of the cargo bed to increase the effective area of the vehicle cargo bed. A ramp may be connected to the cargo bed extender so as to rotate upward and downward.

In a separate aspect, the present invention may be directed to a combination vehicle and cargo bed extender. The vehicle may include a cargo bed which includes a bed floor with a perimeter. The convertible ramp body may include a cargo bed extender that can be positioned generally adjacent to a rear edge of the cargo bed to increase the effective area of the vehicle cargo bed. A ramp may be connected to the cargo bed extender so as to rotate upward and downward. The cargo bed extender is preferably configured such that the vertical height from the ground does not have to substantially change after detaching the cargo bed extender from the truck. This preferably allows the cargo extender to be stored at roughly the same height after detaching as it is maintained during use.

In a separate aspect, the present invention may be directed to a combination vehicle and cargo bed extender. The vehicle may include a cargo bed which includes a bed floor with a perimeter. The convertible ramp body may include a cargo bed extender that can be positioned generally adjacent to a rear edge of the cargo bed to increase the effective area of the vehicle cargo bed. A jack may be located on an underside of the cargo bed extender. A ramp may be connected to the cargo bed extender so as to rotate upward and downward.

In a separate aspect, the present invention may be directed to a combination vehicle and cargo bed extender. The vehicle may include a cargo bed which includes a bed floor with a perimeter. The convertible ramp body may include a cargo bed extender that can be positioned generally adjacent to a rear edge of the cargo bed to increase the effective area of the vehicle cargo bed. A jack may be located on an underside of the cargo bed extender. A ramp may be connected to the cargo bed extender so as to rotate upward and downward. The cargo bed extender is preferably configured such that the vertical height from the ground does not have to substantially change after detaching the cargo bed extender from the truck. This preferably allows the cargo extender to be stored at roughly the same height after detaching as it is maintained during use.

BRIEF DECRYPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 1 is a rear right side perspective view of a vehicle 100, shown as a pickup truck or similar vehicle, having a cargo bed 102. The cargo bed 102 preferably includes a bed floor 104, configured for storing and transporting items, surrounded by a first lateral sidewall 106 on its right side, a second lateral sidewall 108 on its left lateral side, a horizontal sidewall 110 on its front axial side, and a bed opening 114 which may include a rear gate 113 at its rear axial side. The vehicle 100 may also include a bumper 116 slightly below the bed opening 114, and a towing bracket 118, such as a trailer hitch, positioned below the bumper 116 and/or close to the bed opening 114.

Figure 2:
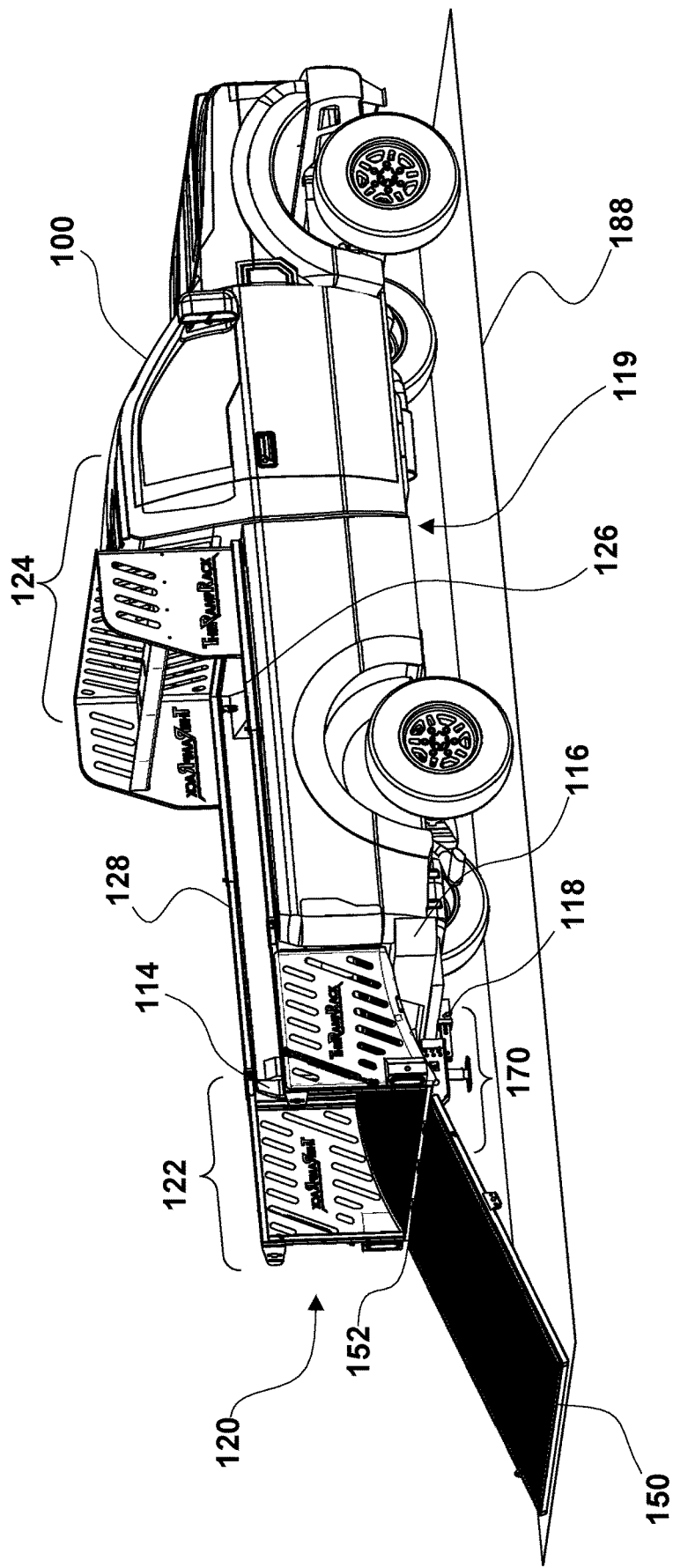

FIG. 2 is a rear right side perspective view of a combination 119 vehicle 100 and convertible ramp body 120 of a preferred embodiment. The convertible ramp body 120 preferably includes a storage shelf body 124 on one axial end, preferably the front side, and a cargo bed extender 122 on the opposite axial end, preferable the rear side. The storage shelf body 124 and cargo bed extender 122 are preferable connected to one another by a first sidewall beam 126 on the right lateral side of the convertible ramp body 120 and a second sidewall beam 128 on the left lateral side of the convertible ramp body 120. A ramp 150 is preferably connected to the cargo bed extender 122 by a pivotal connection 152 to allow the ramp 150 to rotate. The cargo bed extender 122 may also include a towing bracket connector 170 extending downward from its underside. The combination 119 preferably includes the convertible ramp body 120 being positioned about the cargo bed 102 such that the storage shelf body 124 is positioned above the horizontal sidewall 110, the first sidewall beam 126 is positioned on the first lateral sidewall 106, the second sidewall beam 128 is positioned on the second lateral sidewall 108, and the cargo bed extender 122 abuts the bed opening 114 (with the rear gate 113 having been removed) and is positioned above the bumper 116 and towing bracket 118. A portion of the towing bracket connector 170 preferably engages the towing bracket 118.

Figure 3:
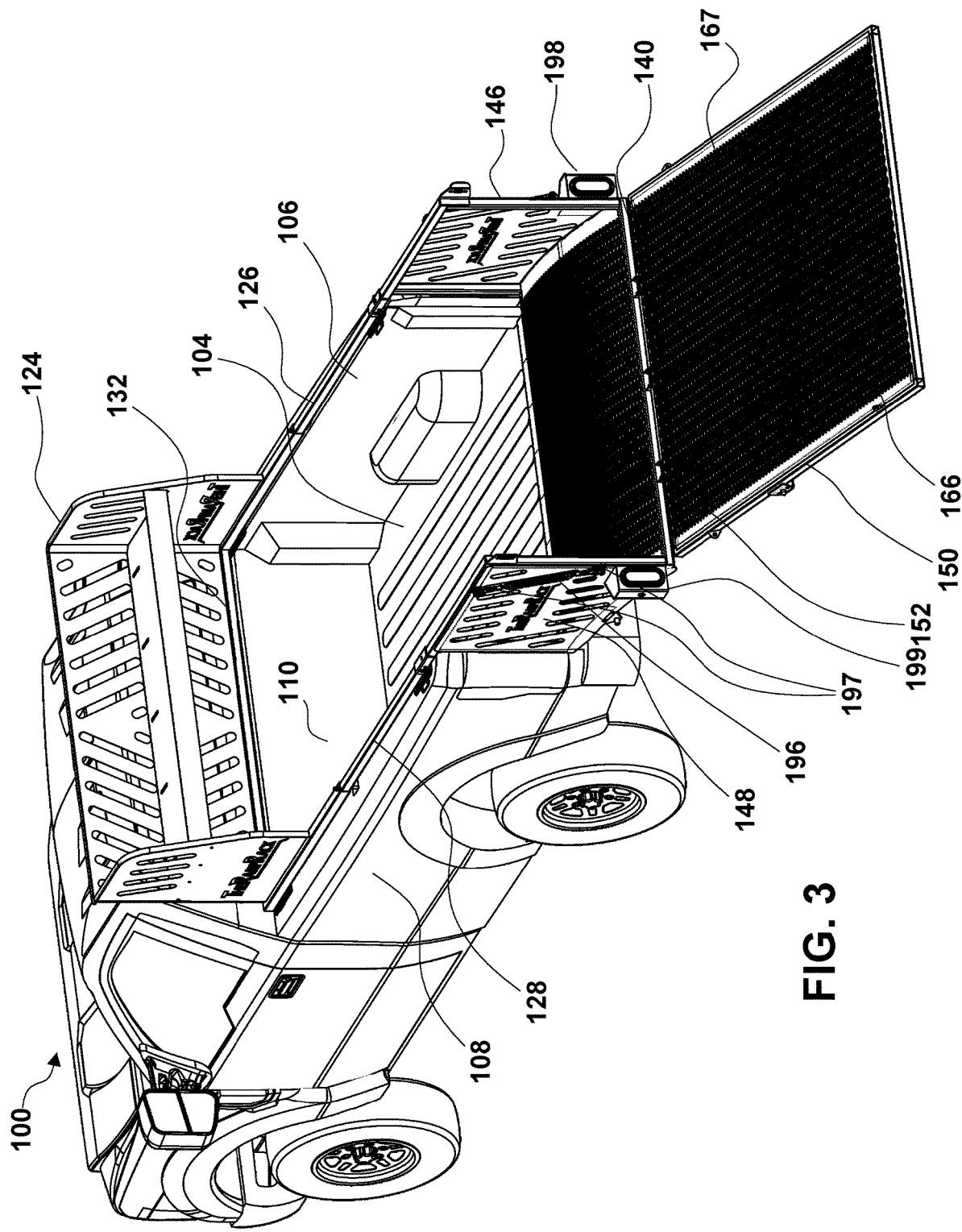

FIG. 3 is a rear left perspective view of the combination 119 of a preferred embodiment, showing the path that rolling tools 190, such as tractors, pressure washers, and any other tools with wheels or treads, might take to move partially or fully onto the bed floor 104. The cargo bed extender 122 preferably includes a first flooring section 140 over a cargo bed extender frame 164 that forms a roll-off portion 144 between the ramp 150 and the bed floor 104. A roll ledge 123 may cover any gap between the first flooring section 140 and the bed floor 104. The ramp 150 is preferably connected to the cargo bed extender 122 by one or more pivotal connections 152 and may preferably include a ramp frame 166 with a ramp floor 167 thereon. Rolling tools 190 would preferably travel from the support surface 188 onto the ramp floor 167, up the ramp floor 167 and onto the first flooring section 140, across the roll ledge 123, and finally onto the bed floor 104.

Figure 4:
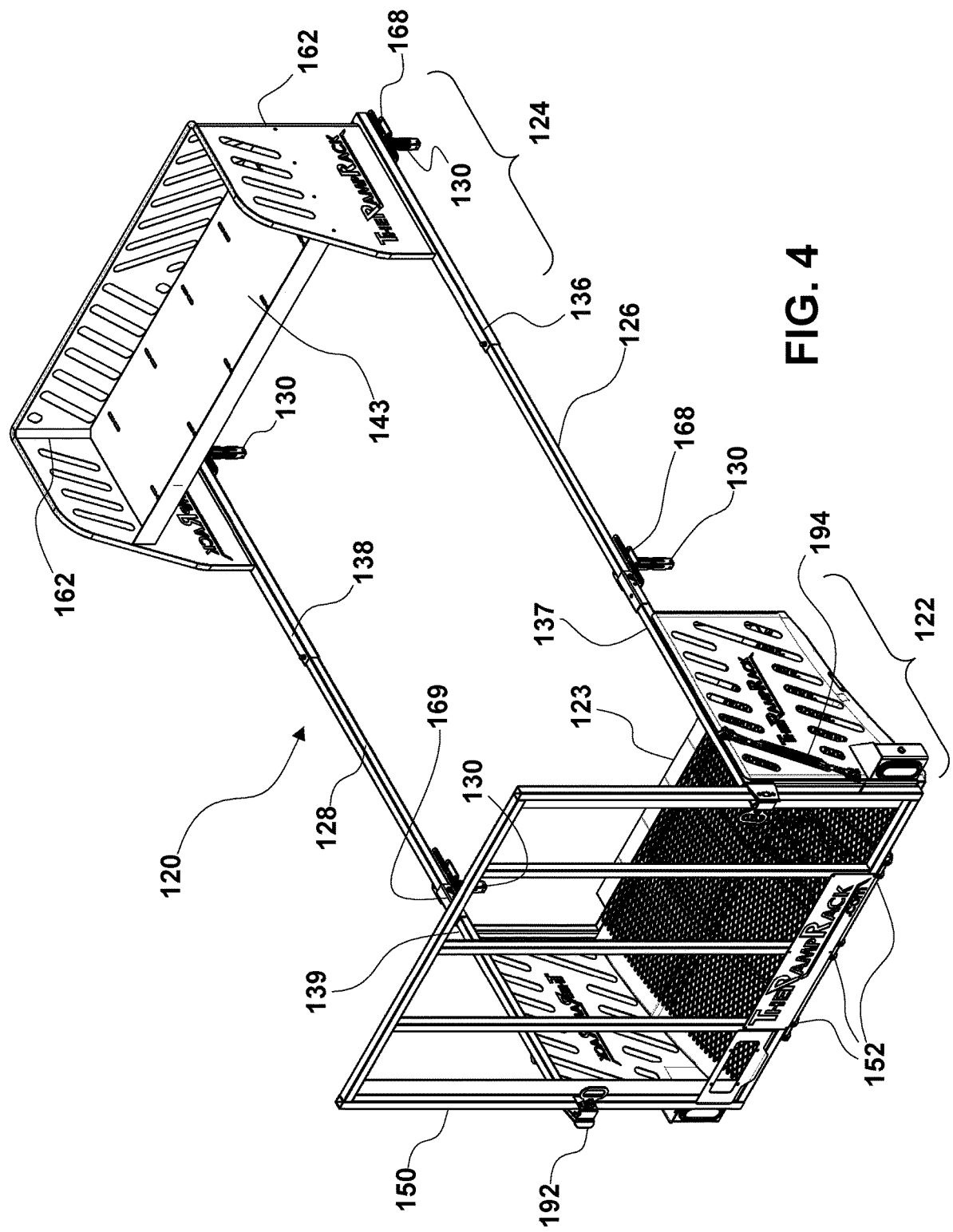

FIG. 4 is a rear right side perspective view of the convertible ramp body 120 of a preferred embodiment, to better demonstrate the preferred configuration of the convertible ramp body 120 without a vehicle 100 being shown. The figure provides a better view of the horizontal sidewall beam 128 which, when the convertible ramp body 120 is positioned about the cargo bed 102, is preferably positioned along the horizontal sidewall 110 of the vehicle 100. The figure also demonstrates that the first sidewall beam 126 and/or second sidewall beam 128 may include some or all of a plurality of securing posts 130, protrusions configured to be inserted into some or all of the bed openings 114 in the first lateral side wall 106 and/or second lateral sidewall 108 to keep the convertible ramp body 120 from shifting laterally once placed about the cargo bed 102. A plurality of mounting brackets 168 may also be included to connect the convertible ramp body 120 to the cargo bed 102 to keep the convertible ramp body 120 from shifting vertically, or lifting upward, which might remove the securing posts 130 from the bed openings 114. The cargo bed extender 122 may also include a first sidewall extender 146 positioned proximate to the first lateral sidewall 106 and a second sidewall extender 148 positioned proximate to the second lateral sidewall 108. The first sidewall extender 146 and second sidewall extender 146 are walls roughly perpendicular to the bed floor 104 and roughly of the same height as the first and second lateral sidewalls 106, 108 to effectively extend the walls of the cargo bed 102 to increase storing capacity.

Figure 5:
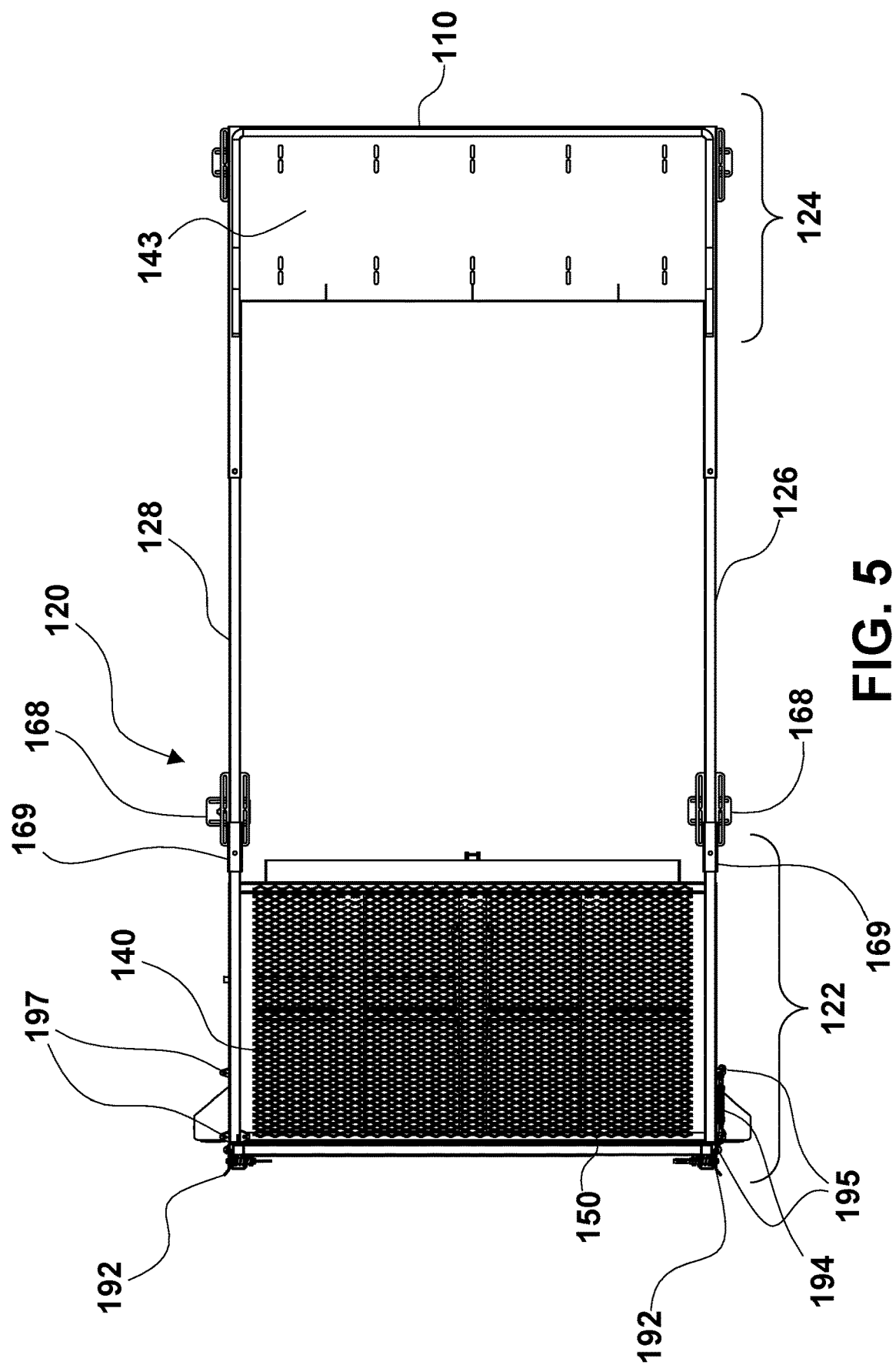

FIG. 5 is a top plan view of the convertible ramp body 120 of a preferred embodiment with the ramp 150 in an upright, or blocking, position. The open space in the center shows that the bed floor 104 preferably remains largely uncovered when the convertible ramp body 120 is positioned about the cargo bed 102. In some preferred embodiments, the storage shelf body 124, and specifically the shelf flooring section 143 and the shelf support arm 163, which supports the shelf flooring section 143, are positioned directly above a portion of the bed floor 104. In other words, a portion of the storage shelf body 124 may be positioned above a portion of the bed floor 102. However, it is preferred that the shelf flooring section 143 and the shelf support arm 163 be held higher that the top most portion of any of the first lateral sidewall 106, second lateral sidewall 108, or horizontal sidewall 110. This preferred configuration allows for storage within the cargo bed 102 under the storage shelf body 124 and ensures that no part of the bed floor 104 is directly covered by the convertible ramp body 120, as this might decrease the effective area of the cargo bed 102.

Figure 6:
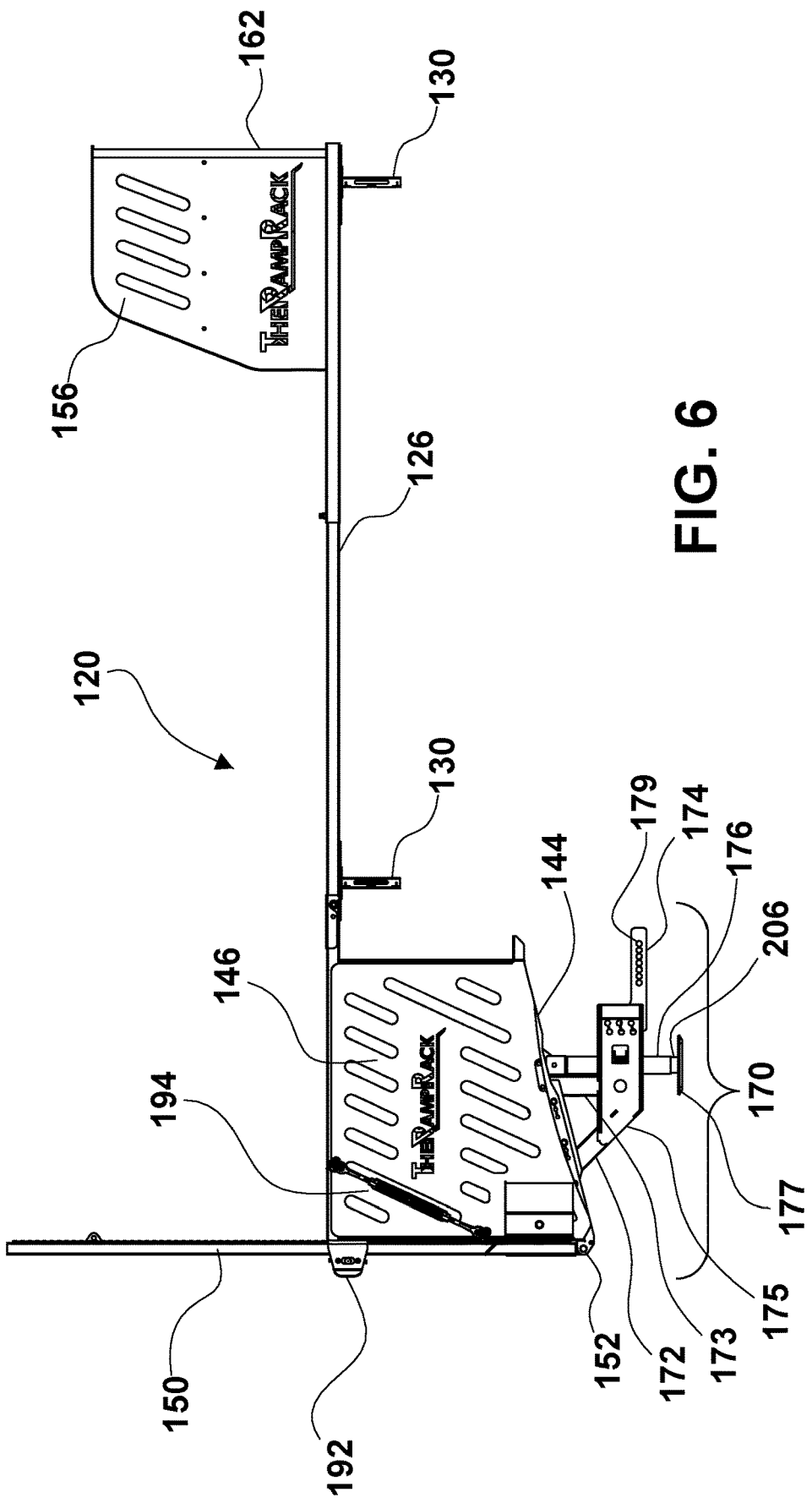

FIG. 6 is right side elevational view of the convertible ramp body 120 of a preferred embodiment, with the ramp 150 in an upright position. This is also referred to as the blocking position. The figure shows that the storage shelf body 124 preferably includes a first shelf sidewall 156 and second shelf sidewall 158 on opposite lateral sides, and a horizontal shelf sidewall 160 on the axial end above the horizontal sidewall 110 of the cargo bed 102. This design ensures that anything positioned on the storage shelf body 124, and preferably on the shelf flooring section 143, may fall onto the bed floor 104 if such items become dislodged form the shelf flooring section 143. The figure also demonstrates that the first sidewall extender 146 (and the second sidewall extender 148, which is provided in a mirror-image shape to the first sidewall extender 146) has a unique shape, where the upper side of the first sidewall extender 146 is preferably roughly the same height as the first sidewall beam 126 and straight. Conversely, the lower end of the first sidewall extender 146 (and second sidewall extender 148) may be angled or curved to correspond with the shape of the roll-off portion 144. The roll-off portion 144, also referred to as the support panel 144, may have an arcuate shape. In other words, it may be curved such that a first support panel end is closer to the support surface 188 (also referred to as the ground) than a second support panel end, which is preferably held at the same height as the bed floor 104.

Figure 7:
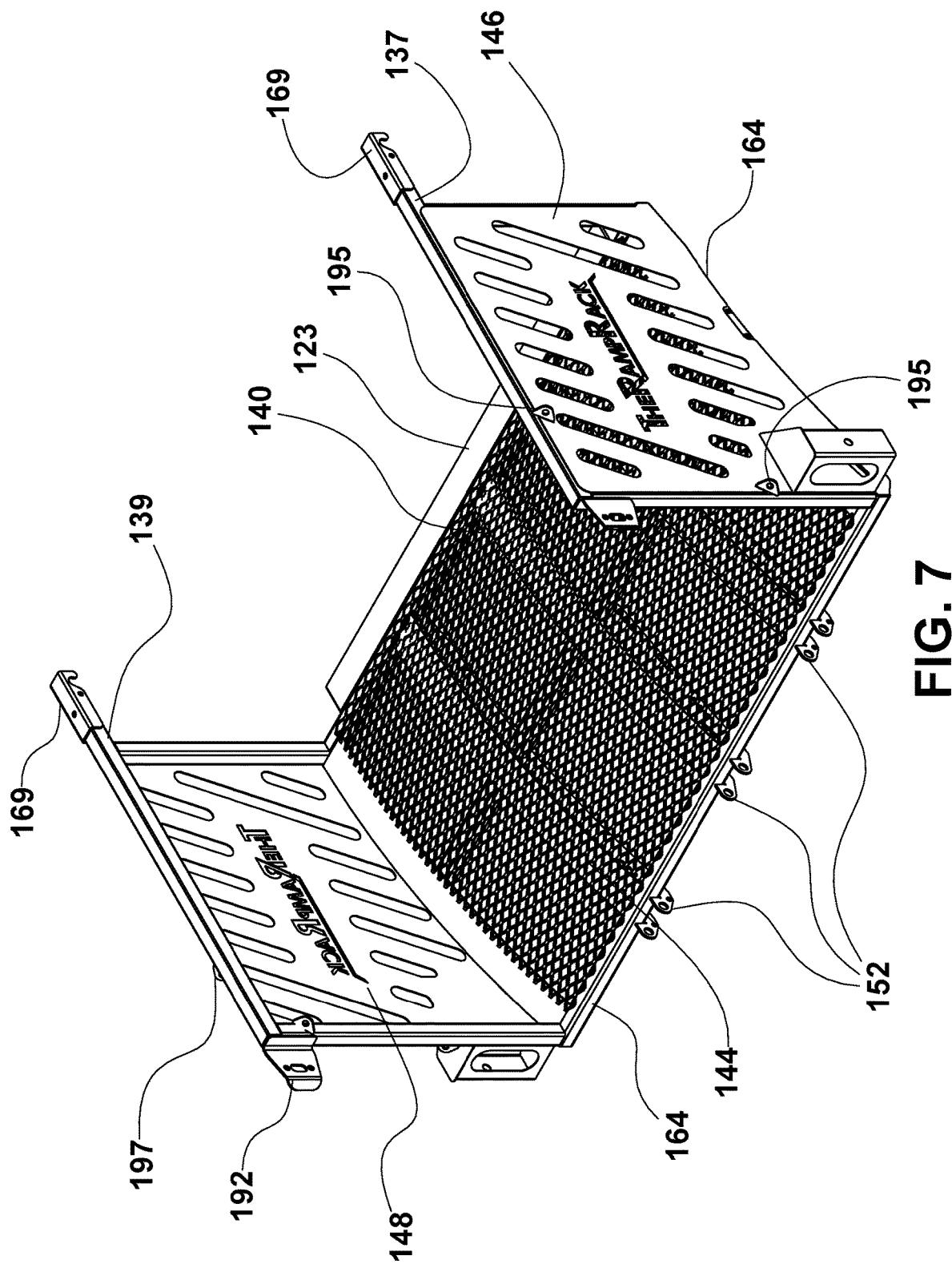

FIG. 7 is a partial rear right side perspective view of the cargo bed extender 122 of the preferred embodiment, demonstrating that the cargo bed extender 122 preferably includes a cargo bed extender frame 164, preferably made of steel or metal beams. The cargo bed extender frame 164 is preferably bent or curved to hold the first flooring section 140 at an angle to form the roll-off portion 144. The pivotal connection 152, to which the ramp 150 may be connected, is preferably positioned on the cargo bed extender frame 164 proximate to the roll-off portion 144. The upper ends of the first sidewall extender 146 and second sidewall extender 148 may be formed of metal bars or beams, with a portion of these configured to extend past the end of said sidewall extenders to be positioned partially over the first or second lateral sidewalls 106, 108, respectively. These portions may form the bed extender portion of the first sidewall beam 137 and the bed extender portion of the second sidewall beam 139. The bed extender portion of the first sidewall beam 137 and the bed extender portion of the second sidewall beam 139 may be connected to engagement brackets 169, which may easily attach and detach from the first or second sidewall beams 126, 128. The cargo bed extender 122 preferably further comprises a first turnbuckle 194 which may be detachably connected to one or more first turnbuckle connectors 195 positioned on the outside of the first sidewall extender 146 and/or a second turnbuckle 196 which may be detachably connected to one or more second turnbuckle connectors 197 positioned on the outside of the second sidewall extender 148. The first sidewall extender 146 and second sidewall extender 148 may include a first tail light 198 and a second tail light 199, respectively, or in some preferred embodiments may include housings for the mounting of said tail lights therein.

Figure 8:
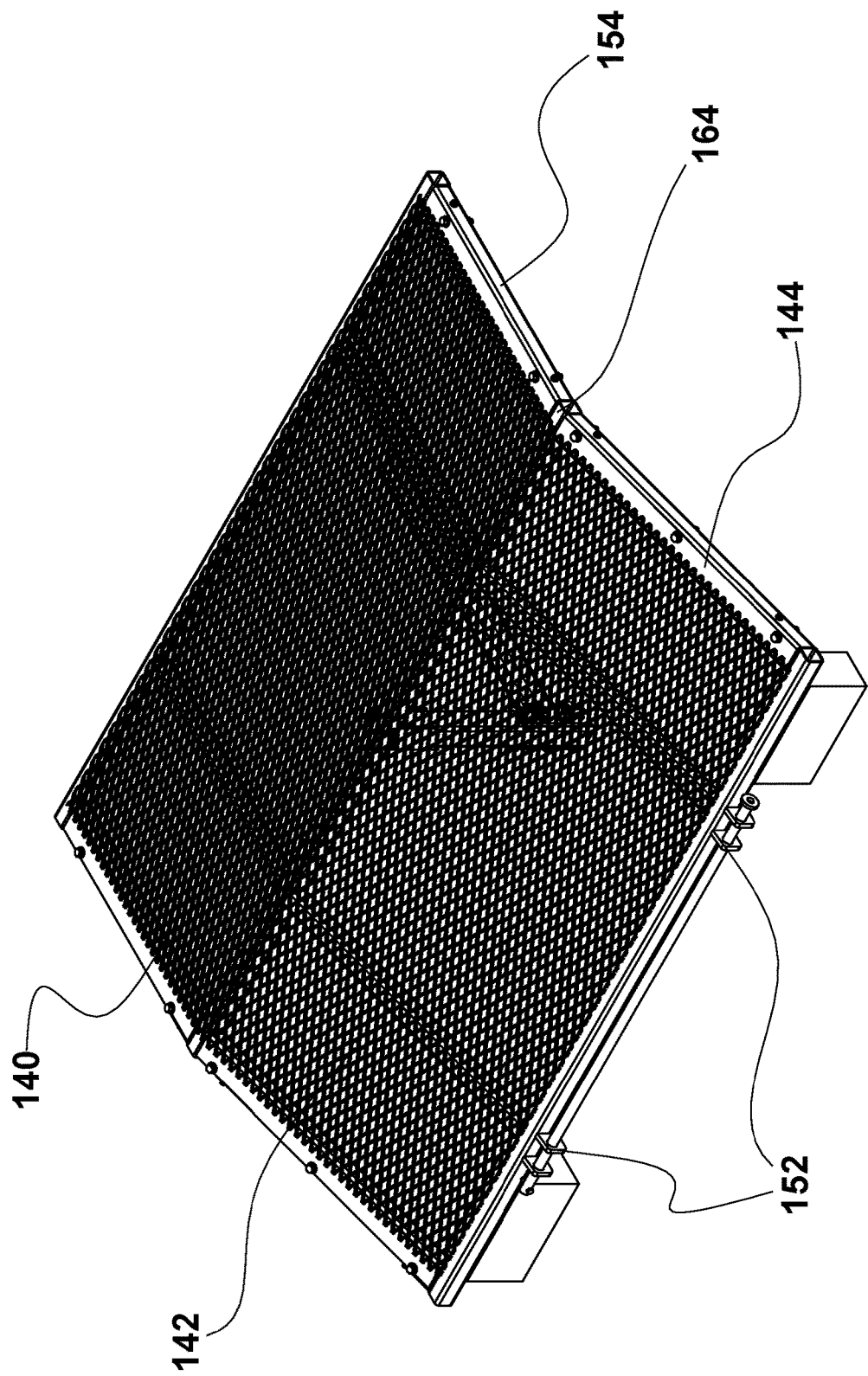

FIG. 8 is a top plan view of the cargo bed extender frame 164 of an alternate preferred embodiment, demonstrating an alternate preferred shape and configuration of the cargo bed extender frame 164. In this preferred embodiment, the cargo bed extender frame 164 is preferably bent at a 160-degree angle about an angular connection in the center thereof. A first flooring section 140 preferably overlays the upper portion which is configured to be held roughly on the same plane as the bed floor 104 to form a vertical support portion 154. A second flooring section 142 preferably covers the lower portion and forms the roll-off portion 144. The roll-off portion 144 is preferably roughly positioned at 160-degrees relative to the vertical support portion 154. In this preferred embodiment, the first spacer portion of the connector 172 is connected to the angular connection of the cargo bed extender frame 164.

Figure 9:
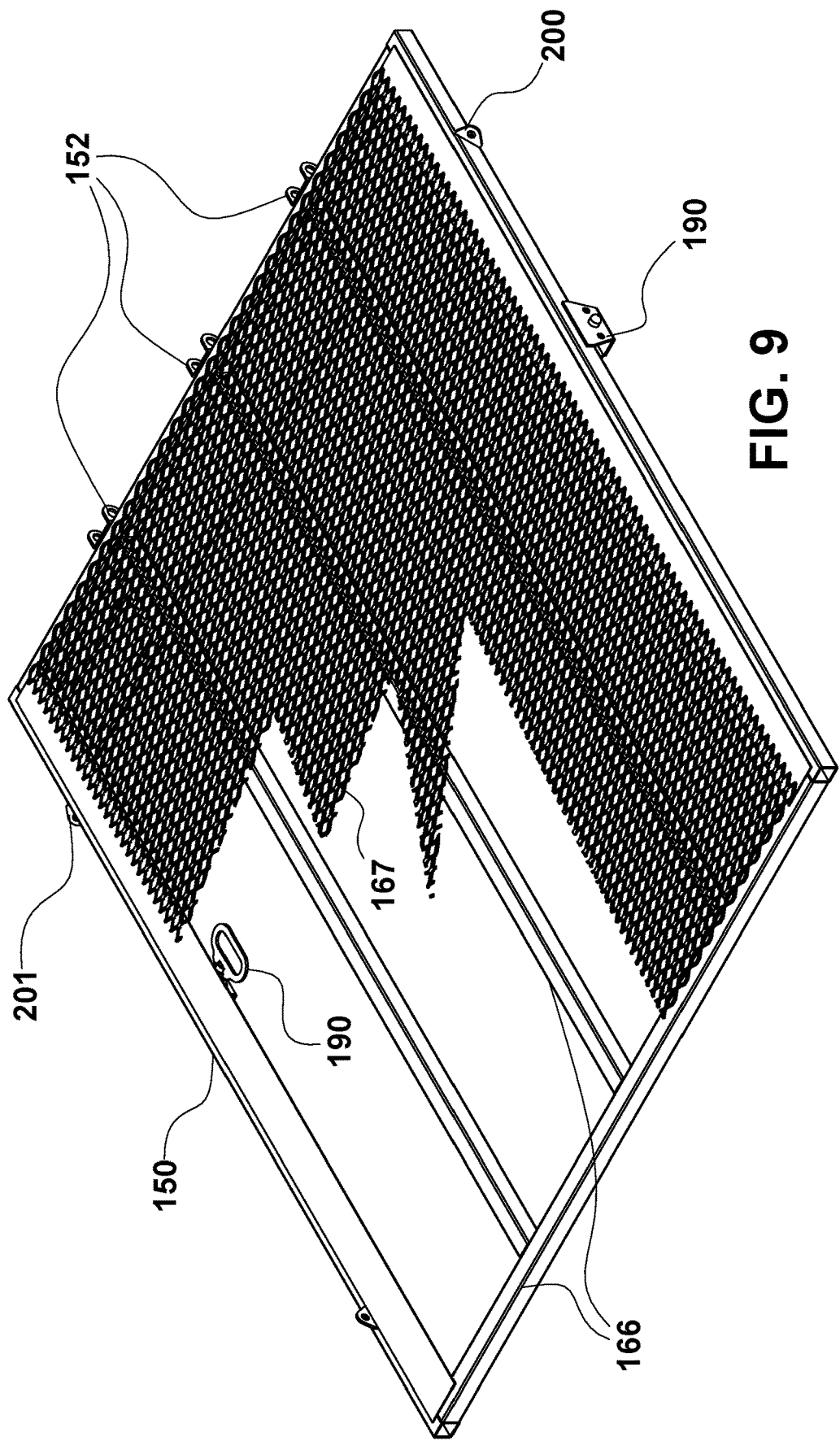

FIG. 9 is a top plan view of the ramp 150 of a preferred embodiment. Preferably, the ramp 150 includes a ramp frame 166, preferably made of steel or metal beams, upon which the ramp floor 167 is positioned. The ramp frame 166 preferably includes a perimeter frame to provide a rough shape to the ramp 150, and two guide struts running axially and which correspond to the rough position of wheels on rolling tools 190, to provide greater support. The ramp frame 166 preferably includes a portion of the pivotal connection 152 on one axial end. The ramp frame 166 may also include either the ramp lock 192 or an engagement segment for engaging the ramp lock 192. The ramp frame 166 may further include a first ramp buckle connector 200 proximate to a front axial corner configured to be positioned near the first sidewall extender 146, and a second ramp buckle connector 201 proximate to a front axial corner configured to be positioned near the second sidewall extender 148. This is to allow the first turnbuckle to 194 to connect to one of the first turnbuckle connectors 195 and the first ramp buckle connector 200 at the same time, and/or to allow the second turnbuckle to 196 to connect to one of the second turnbuckle connectors 197 and the second ramp buckle connector 201 at the same time.

Figure 10:
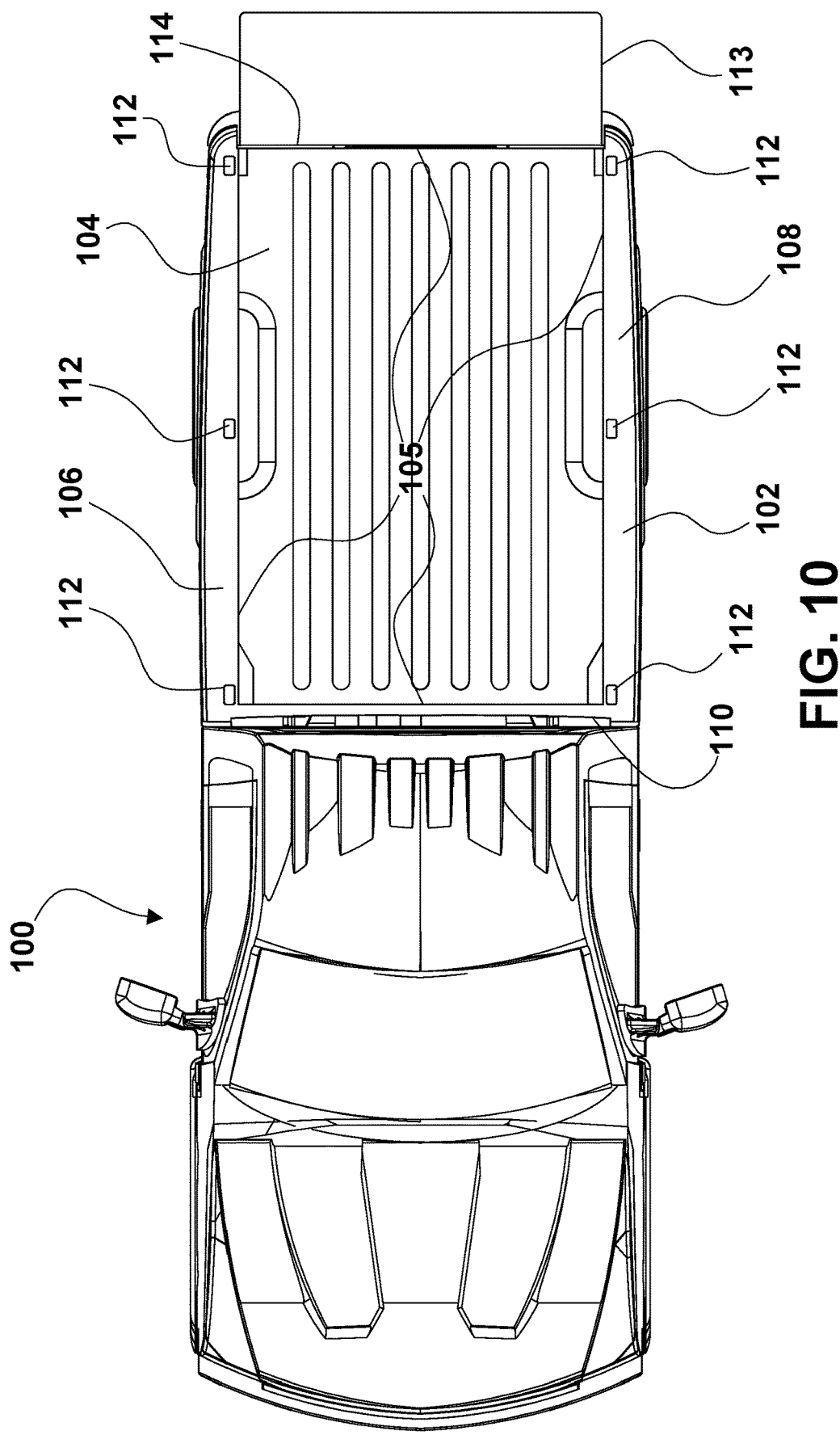

FIG. 10 is a top plan view of the vehicle 100 shown in FIG. 1 to better show that the bed floor 104 has a perimeter 105 defined by the horizontal sidewall 110, first lateral sidewall 106, second lateral sidewall 108, and a bed opening 114, which may include a rear gate 113, such as a pickup truck tailgate, positioned therein. A plurality of sidewall openings 112 may be include in the first lateral sidewall 106 and second lateral sidewall 108, preferably being holes in the top of the first lateral sidewall 106 and second lateral sidewall 108.

Figure 11:
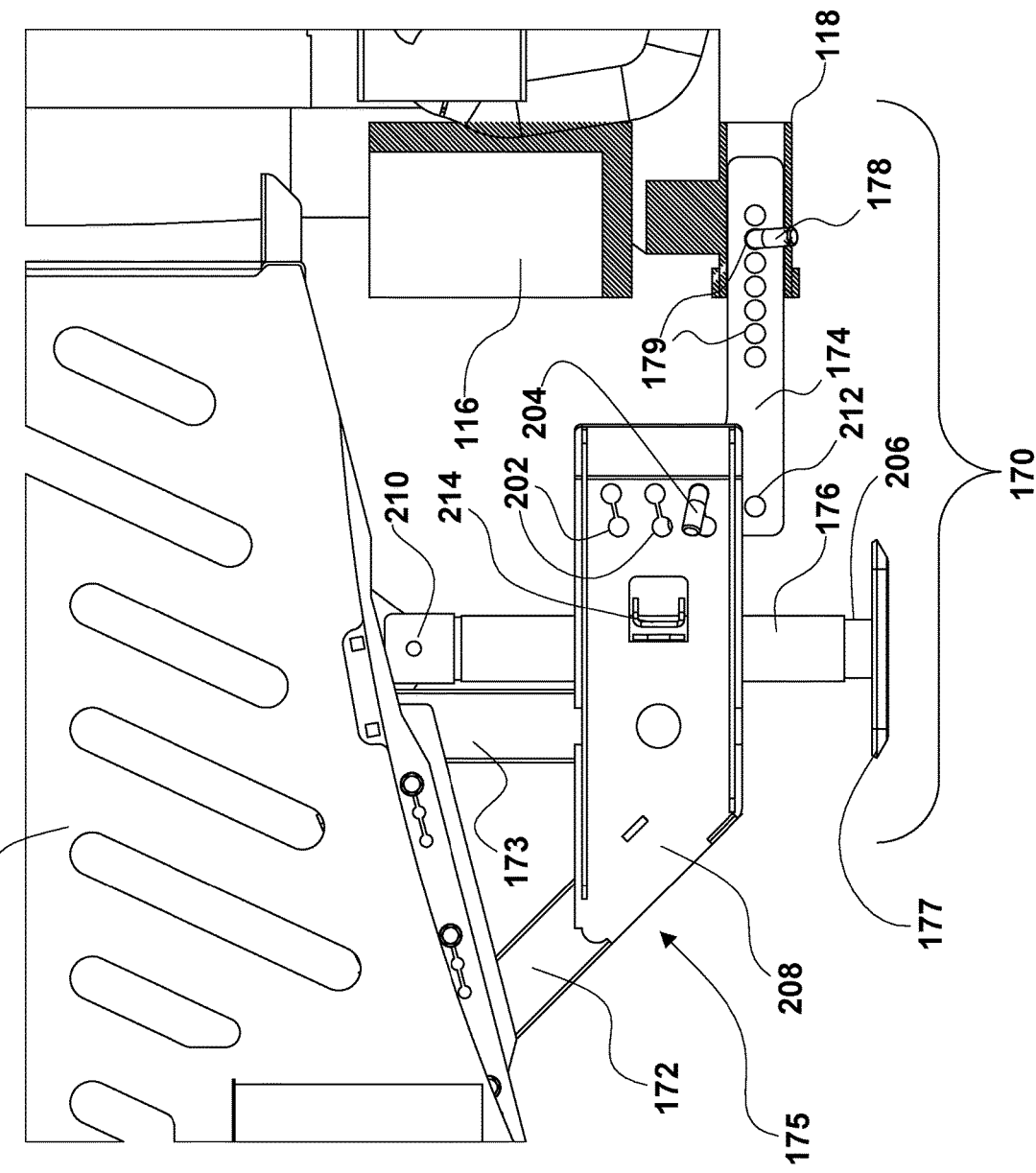

FIG. 11 is a partial right side elevational view of the combination 119 vehicle 100 and convertible ramp body 120 of a preferred embodiment, wherein the convertible ramp body 120 preferable includes a towing bracket connector 170 configured to detachably engage the towing bracket 118 of the vehicle 100. In this preferred embodiment, the towing bracket connector 170 preferably includes a first spacer portion 172 extending diagonally downward from the cargo bed extender frame 164 and a second spacer portion 174 extending roughly straight downward from the cargo bed extender frame 164. The first and second spacer portions 172, 174 preferably both connect to a jack assembly 175. The jack assembly 175 is preferably formed of at least one jack plate 208 surrounding a telescoping rod 176 surrounding an extendable leg 206 ending in a footer 177 configured to contact a transfer surface 188. The portion of the telescoping rod 176 farthest from the footer 177 preferably forms a connecting cap 210 configured to connect to the cargo bed extender frame 164. The jack assembly 175, also referred to herein as the jack 175, may also include cross plates 214 that run perpendicularly to the jack plates 208 and pass through the jack plates 208 while squeezing the telescoping rod 176. This preferably provides increased support to the telescoping rod 176. The portion of the jack assembly 175 closest to the towing bracket 118 may connect to the engagement portion 174 of the towing bracket connector 170. The jack plate 208 may include a plurality of rack openings 202 configured to correspond to vertical adjustment openings 212 in the engagement portion 174. By raising or lowering the engagement portion 174 until it aligns with a preferred rack opening 202, a user may adjust the height of the engagement portion 174 relative to the cargo bed extender frame 164. Once the desired height is reached, a rack pin 204 may be inserted through the rack opening 202 and vertical adjustment opening 212 to secure them in place. In some preferred embodiments, a plurality of pin holes 179 may run through the towing bracket 118 and/or towing bracket connector 170, and a hitch pin 178 may be inserted therethrough to detachably secure the towing bracket connector 170 inside the towing bracket 118. The jack assembly 175 may include an extension drive mechanism, such as a hand crank or motor, to drive the lowering of the extendable leg 206 until the footer 177 reaches the support surface 188.

Figure 12:
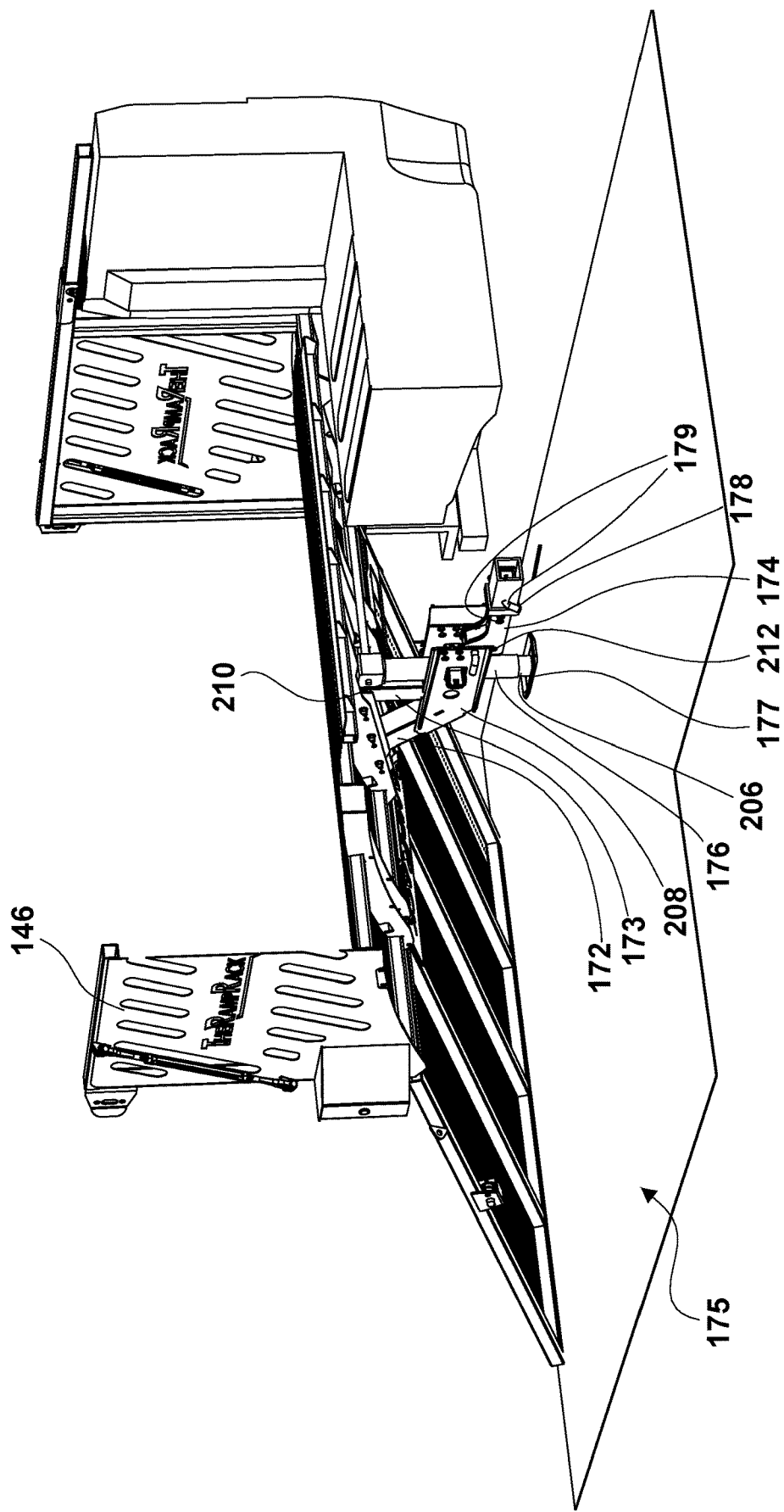

FIG. 12 is a partial perspective view of the convertible ramp body 120 as shown in FIG. 12, wherein the towing bracket connector 170 showing how both the first spacer portion 172 and second spacer portion 173 extend from the cargo bed extender frame 164 to connect to the jack assembly 175. The jack assembly 175 is preferably configured to house the telescopic rod 174 (with the extendable leg 206 ending in a footer 177 which may lower to contact the transfer surface 188) and to connect the jack assembly 175 to the engagement portion 174.

Figure 13:
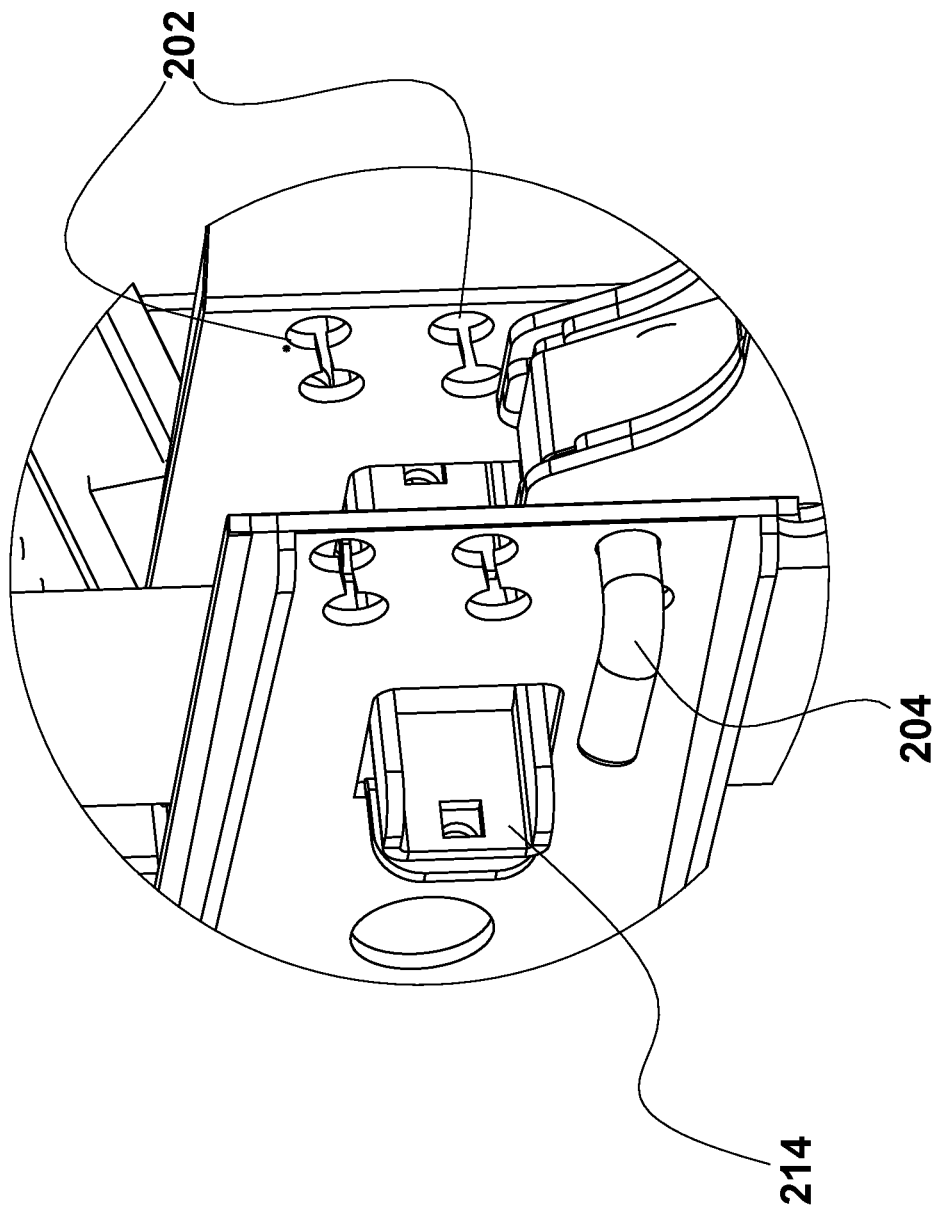

FIG. 13 is an enhanced view of the portion of the jack assembly 175 of FIG. 12, to better demonstrate the preferred configuration of the jack plates 208 and cross plates 214. The figure also shows how the rack pin 204 may pass through some of the rack openings 202 and vertical adjustment openings 212 to adjust the height of the engagement portion 174 relative to the cargo bed extender frame 164.

Figure 14:
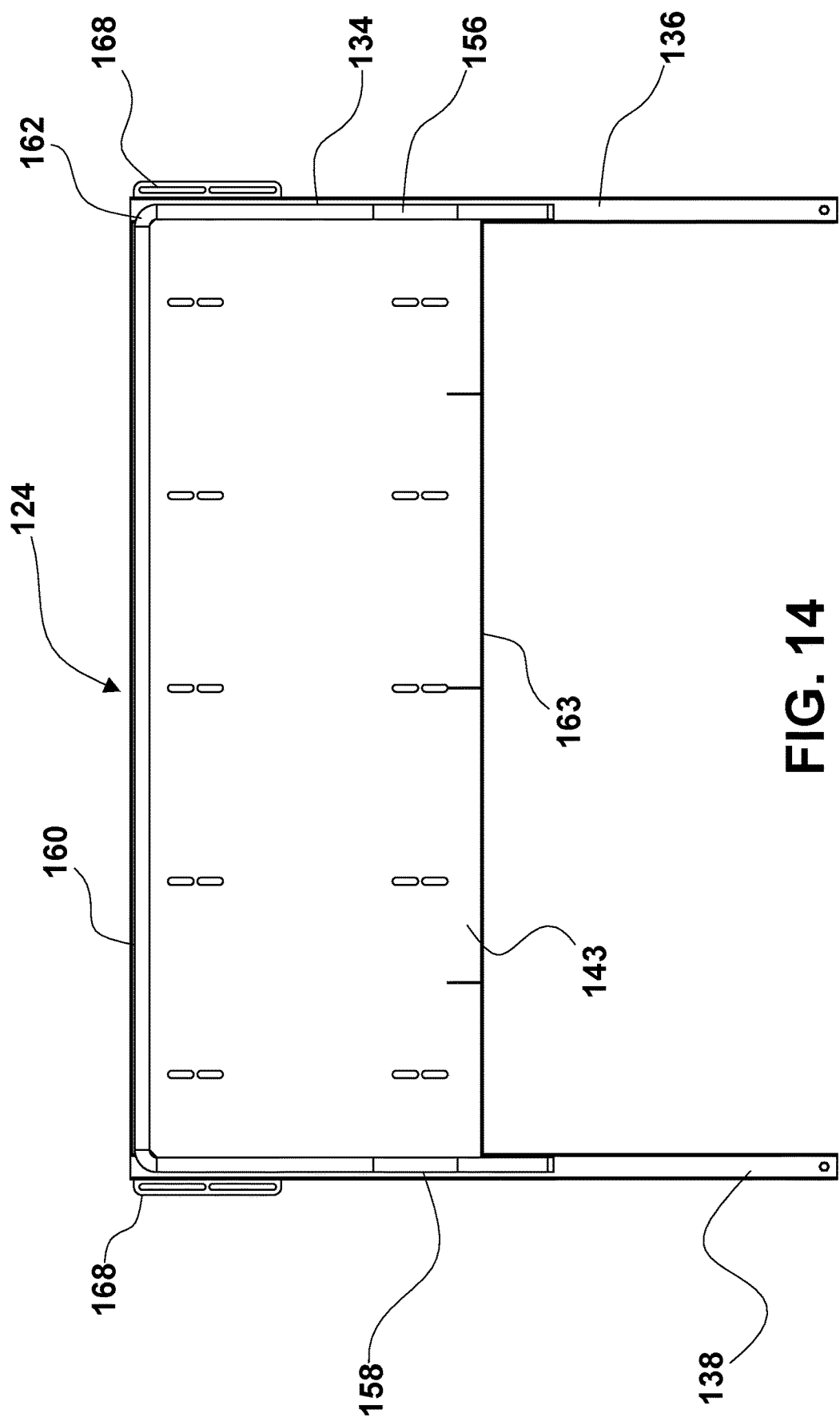

FIG. 14 is a top plan view of the storage shelf body 124 of a preferred embodiment. The storage shelf body 124 preferably includes a shelf frame 134 which forms the shape of the storage shelf body 124. The shelf frame preferably includes shelf support posts 162, which extend vertically upward from the sides of the shelf frame 134, a shelf support arm 163 extending laterally between two shelf support posts 163, and a portion of the shelf frame 134 forming the horizontal sidewall beam 132. A plurality of mounting brackets 168 may connect the shelf frame 134 to the cargo bed 102.

Figure 15:
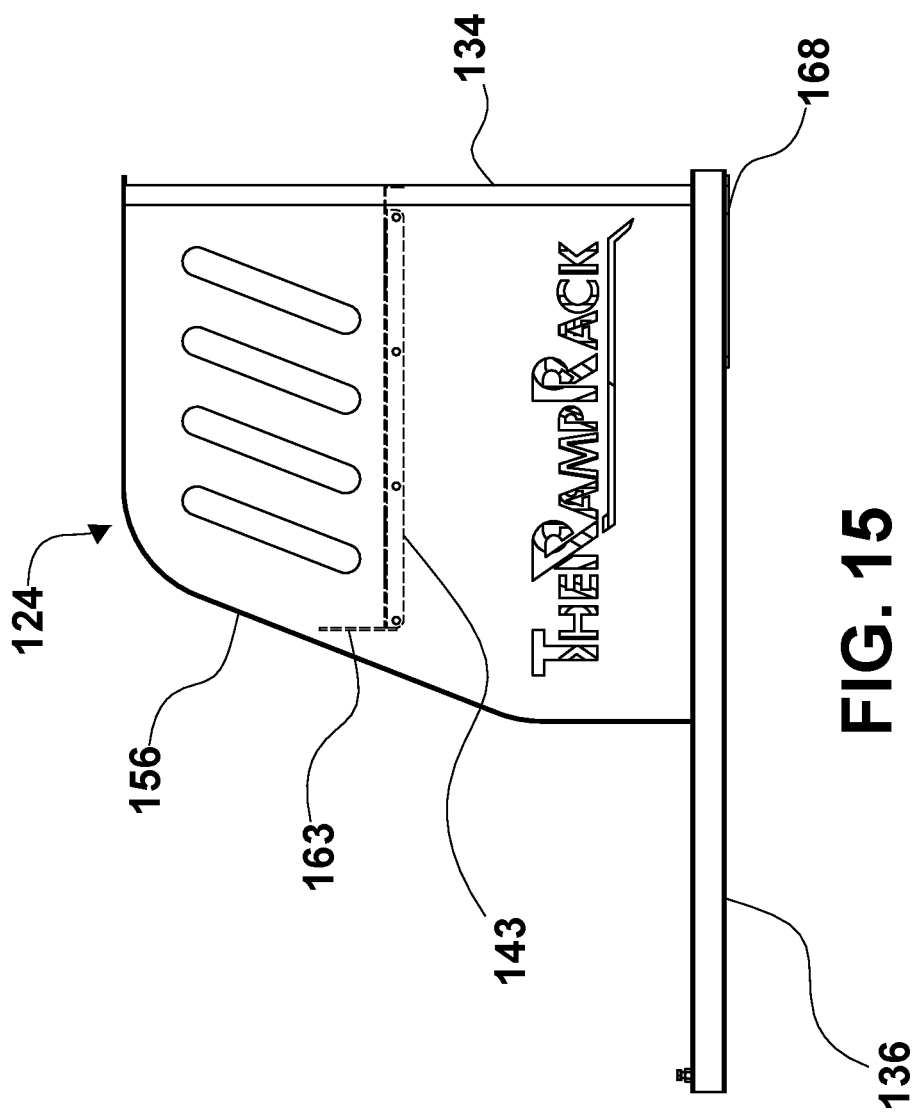

FIG. 15 is a right side elevation view of the storage shelf body 124 of FIG. 14. The figure shows that the shelf frame 134 may include a shelf portion of the first sidewall beam 136 where a portion of the shelf frame 134 overlaps the first lateral sidewall 106. The shelf portion of the first sidewall beam 136 may be connected to the rest of the first sidewall beam 126 by at least one of a plurality of engagement brackets 169. Similarly, the shelf frame 134 may also include a shelf portion of the second sidewall beam 138 where a portion of the shelf frame 134 overlaps the second lateral sidewall 108. The shelf portion of the second sidewall beam 138 may also be connected to the rest of the second sidewall beam 128 by at least one of a plurality of engagement brackets 169. The broken lines show the portion of the storage shelf body 124 which would not be normally seen through the first shelf sidewall 156, to show the preferred positioning of the shelf flooring section 143 relative to the bottom of the shelf frame 134.

Figure 16:
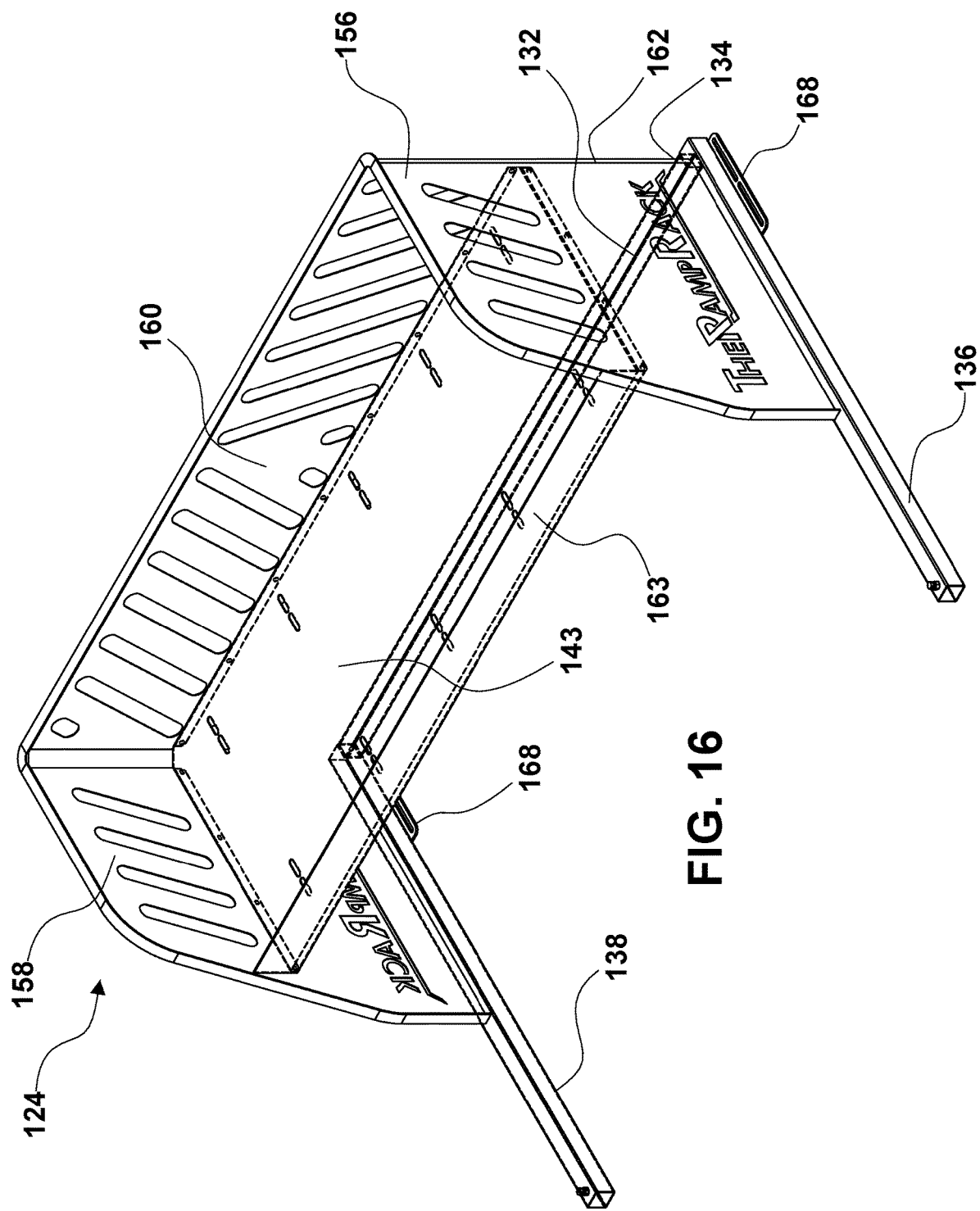

FIG. 16 is a right-side perspective view of the storage shelf body 124 of a preferred embodiment. The storage shelf body 124 preferably includes a first shelf sidewall 156 and second shelf sidewall 158 on opposite lateral sides of the storage shelf body 124, and a horizontal shelf sidewall 160 on the axial end above the horizontal sidewall 110 of the cargo bed 102. A shelf flooring section 143 is preferably positioned along the bottom ends of the first and second shelf sidewalls 156, 158 and horizontal shelf sidewall 160. Essentially, the shelf flooring section 143, first and second shelf sidewalls 156, 158, and horizontal shelf sidewall 160 form four of the six sides of a cube, to create a storage platform for items, including handheld tools 186. The broken lines show the portion of the storage shelf body 124 which would not be normally seen through the storage shelf body 124.

Figure 17:
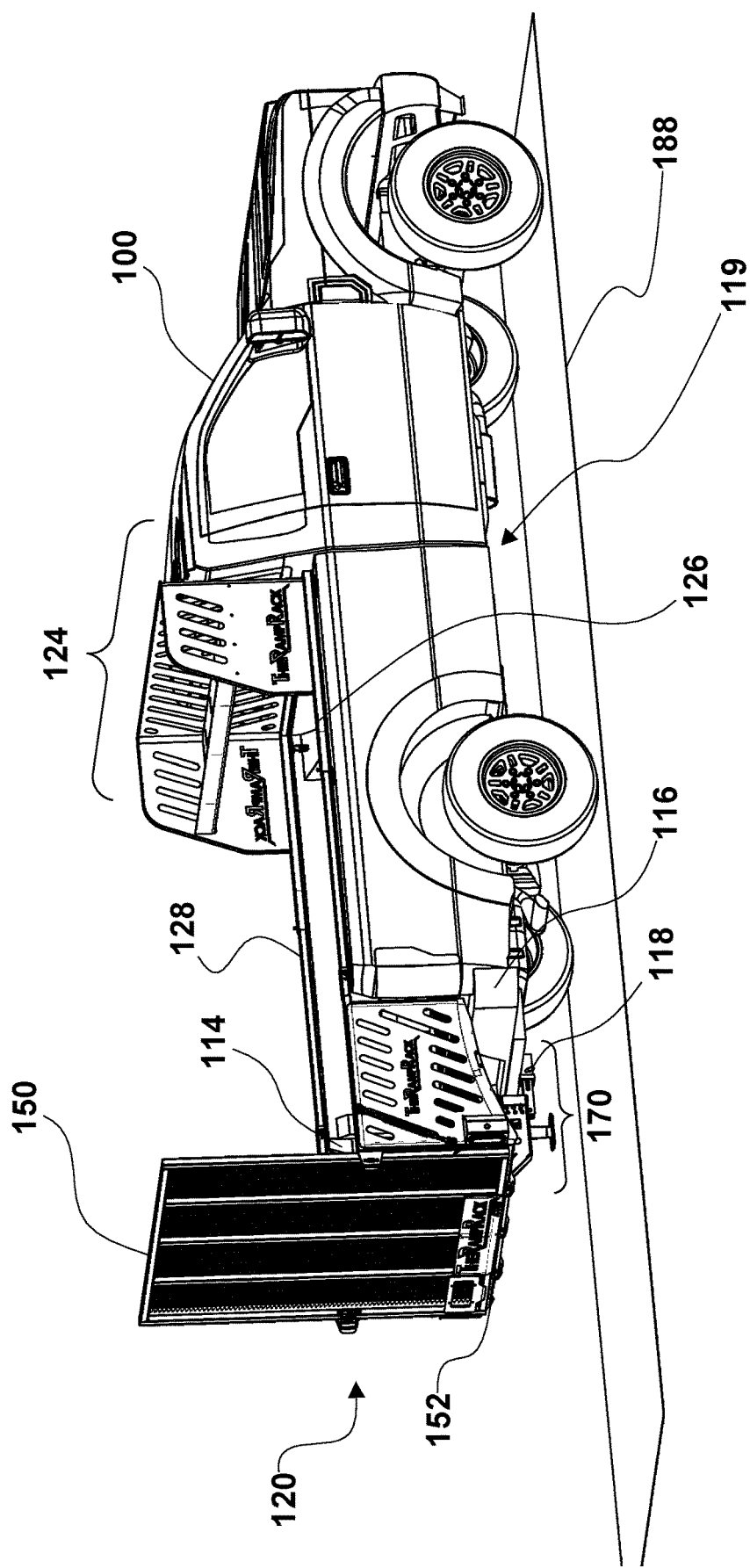

FIG. 17 is a right side elevational view of the combination 119 vehicle 100 and convertible ramp body 120 of a preferred embodiment, wherein the convertible ramp body 120 is positioned about the cargo bed 102 and the ramp 150 is in the fully upright position, also referred to as the blocking position.

Figure 18:
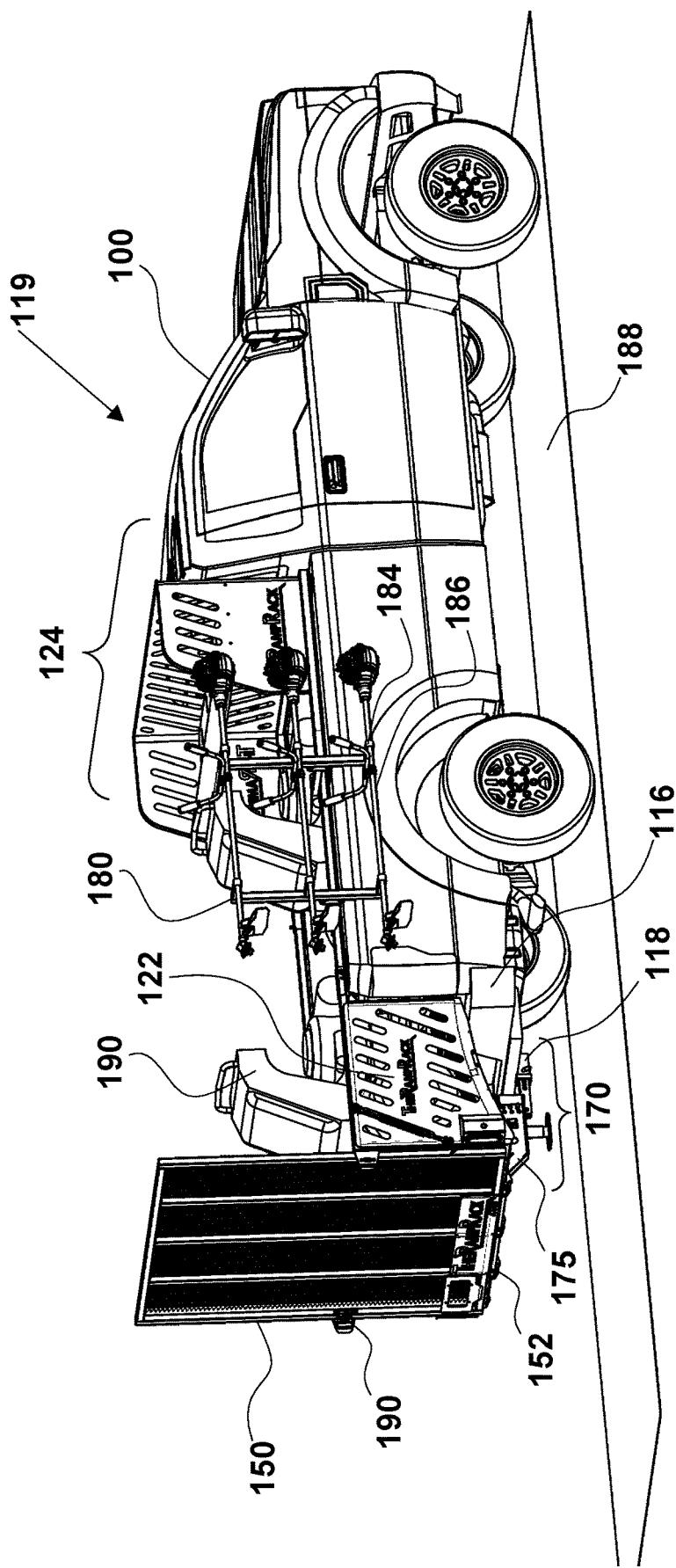

FIG. 18 is an alternate rear right-side perspective view of the combination 119 vehicle 100 and convertible ramp body 120 of a preferred embodiment, wherein the convertible ramp body 120 further comprises a first sidewall hanging rack 180 positioned on the first sidewall beam 126. The first sidewall hanging rack 180 preferably includes hooks 184 for holding handheld tools 186 in order to store said handheld tools 186 on the convertible ramp body 120. The figure further shows rolling tools 190 positioned on the combination 119, with the rolling tools 190 solely on the bed floor 104. The figure further shows that the ramp 150 can be secured in the upright position by the bed lock 192 so long as no part of the rolling tools 190 extend past the pivotal connection 152.

Figure 19:
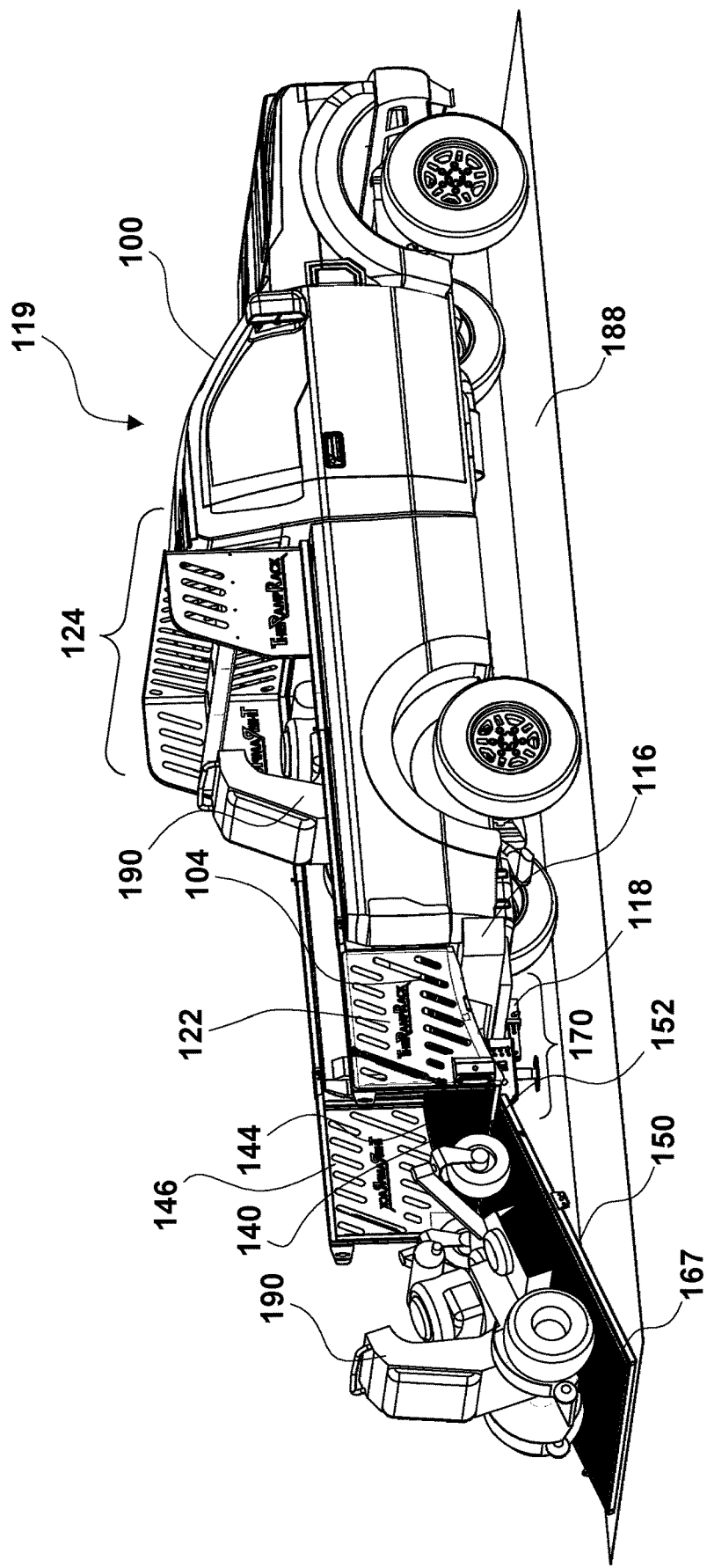

FIG. 19 is an alternate right rear perspective view of the combination 119 vehicle 100 and convertible ramp body 120 of FIG. 18, with the ramp 150 having been lowered to rest on the transfer surface 188. The figure shows the path that rolling tools 190 must take to be stored in the cargo bed 102. Rolling tools 190 must travel from the transfer surface 188, onto the ramp floor 167, onto the second flooring section 142 (and thus being positioned on the roll-off portion of the cargo bed extender 122), onto the first flooring section 140 (and thus being position on the vertical support portion 154 of the cargo bed extender 122), and finally onto the bed floor 104.

Figure 20:
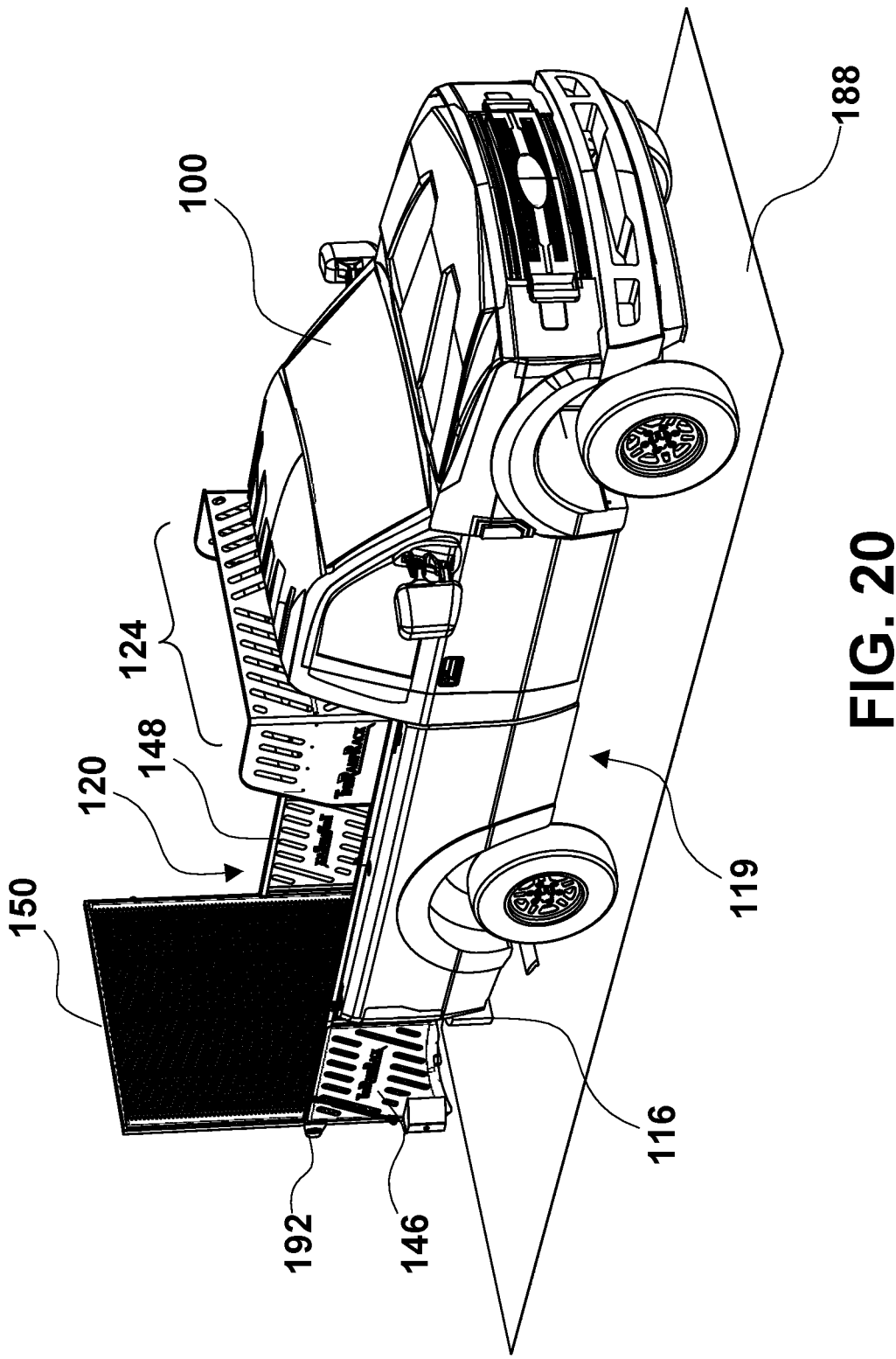

FIG. 20 is a front right side perspective view of the combination 119 vehicle 100 and convertible ramp body 120 of a preferred embodiment, with the ramp 150 in the fully upright position. The ramp 150 is preferably secured in place by a ramp lock 192. The vehicle 100 is shown positioned on a transfer surface 188, such as the ground, road, or any other surface. The transfer surface 188 is also referred to herein as the ground 188.

Figure 21:
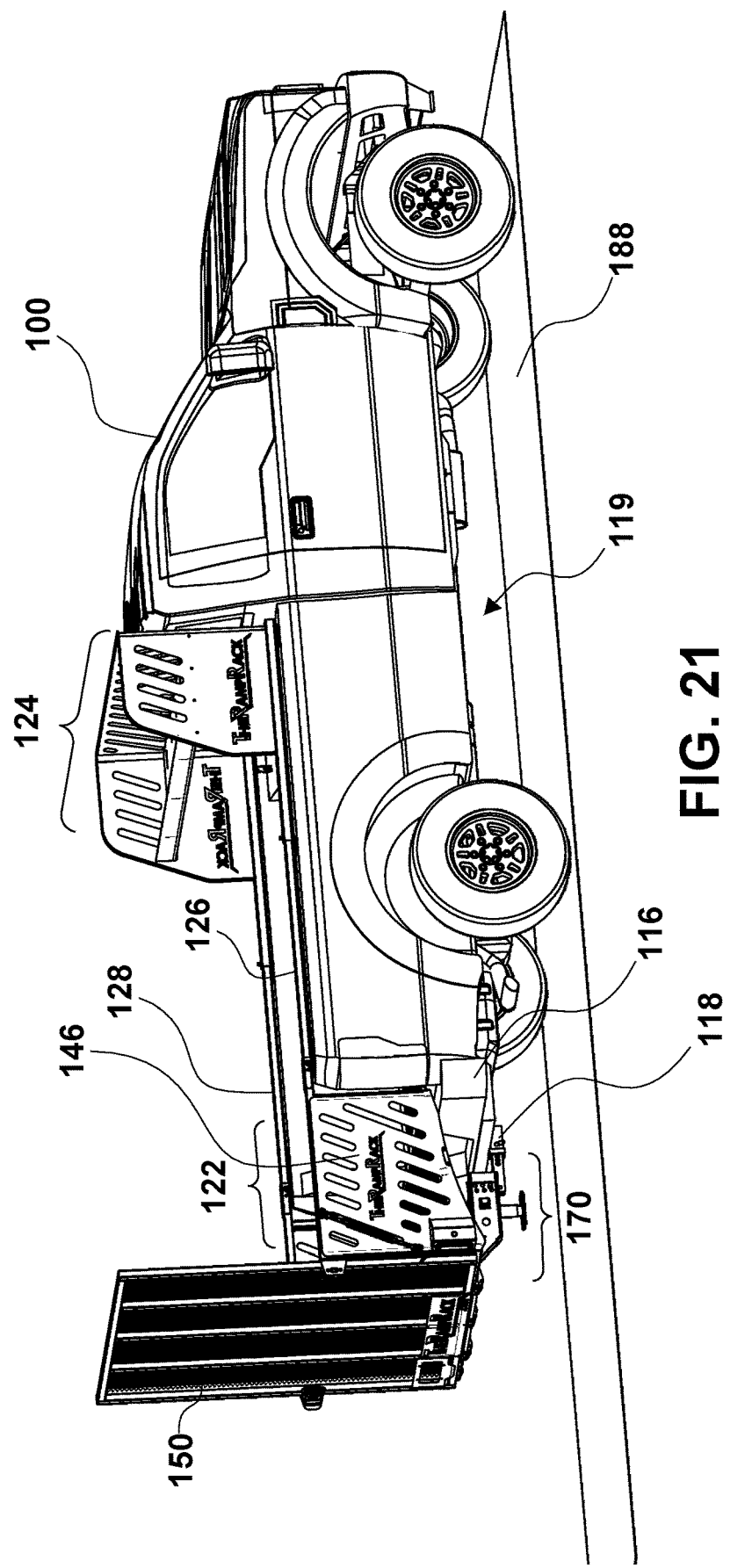

FIG. 21 is right side perspective view of the combination 119 vehicle 100 and convertible ramp body 120 of a preferred embodiment. The figure shows the first step of the method for detachably removing and storing the cargo bed extender 122 and ramp 150 separate from the rest of the combination 120. In the first step, the combination 120 is provided positioned about the cargo bed 102 of a vehicle 100, with the storage shelf body 124 positioned on one axial end of the cargo bed 102 and the cargo bed extender 122 positioned proximate to the opposite axial end of the cargo bed 102. The storage shelf body 124 and cargo bed extender 122 are preferably connected on opposite lateral ends of the cargo bed 102 by first and second sidewall beams 126 and 128. Engagement brackets 169 preferably connect the cargo bed extender 122 to the first and second sidewall beams 126, 128. The cargo bed extender 122 is preferably connected to the towing bracket 118 of the vehicle 100 via a towing bracket connector 170. A first turnbuckle 194 is preferably stored on the first sidewall extender 146, preferably being connected to one or more first turnbuckle connector 195. A second turnbuckle 196 is preferably stored on the second sidewall extender 148, preferably being connected to one or more second turnbuckle connector 197. The ramp 150 is preferably connected to the cargo bed extender 122 via at least one pivotal connection 152, and may be secured in the blocking position by a ramp lock 192. The ramp 150 may form a gate for an end of the expanded cargo bed, formed by the cargo bed 102 and the cargo bed extender 122 when the ramp is in the blocking position.

Figure 22:
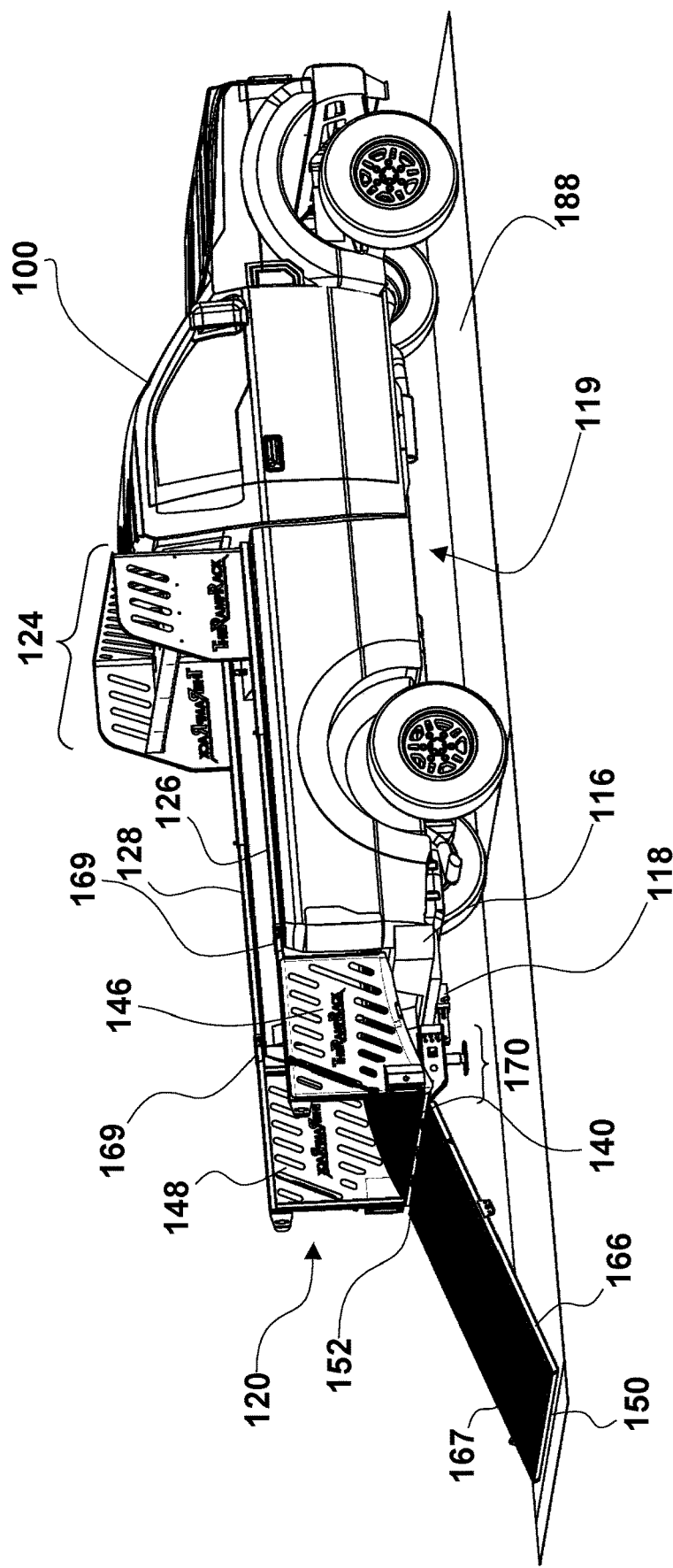

FIG. 22 is right side perspective view of the combination 119 vehicle 100 and convertible ramp body 120 of a preferred embodiment. The figure shows the second step of the method for detachably removing and storing the cargo bed extender 122 and ramp 150 separate from the rest of the combination 120. In the second step, the ramp 150 has been rotated such that the free end has been lowered to the support surface 188. The ramp 150 may be said to be in a ground contacting position when it has been lowered to contact the transfer surface 188. In this step, the engagement portion of the connector 174 is connected to the jack assembly 175 via a rack pin 204 which passes through two of the rack openings 202 and through one of the vertical adjustment opening 212. The extendable leg 206 is stored mostly within the telescoping rod 176 such that the footer 177 is preferably held closer to the bumper 116 than the support surface 188. The first turnbuckle 194 and or second turnbuckle 196 remain positioned on the first and second sidewall extenders 146, 148, respectively.

Figure 23:
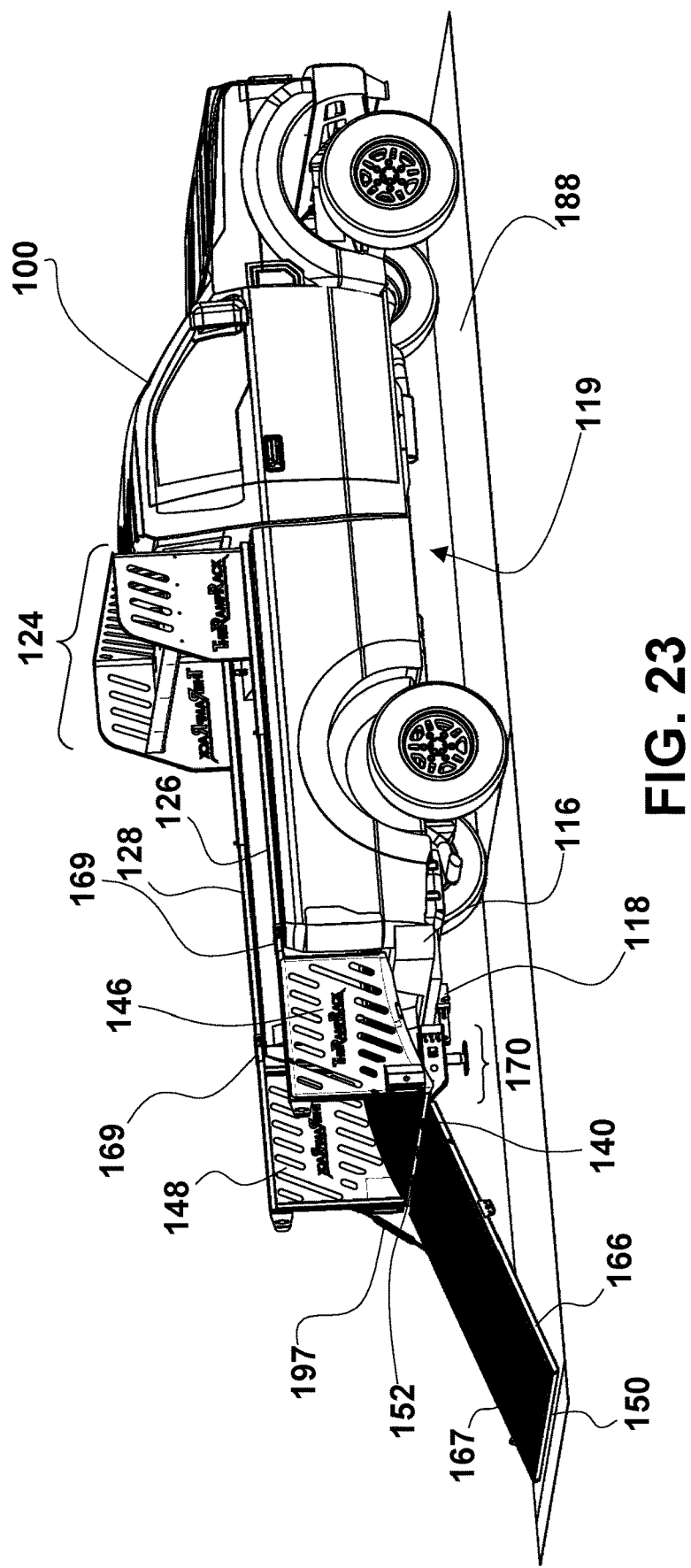

FIG. 23 is right side perspective view of the combination 119 vehicle 100 and convertible ramp body 120 of a preferred embodiment. The figure shows the third step of the method for detachably removing and storing the cargo bed extender 122 and ramp 150 separate from the rest of the combination 120. In the third step, the second turnbuckle 196 has been removed from its position on the second sidewall extender 148 and is instead positioned in the angle formed between the ramp 150 and second sidewall extender 148. The second turnbuckle 196 preferably connects to one of the second turnbuckle connectors 197 and second ramp turnbuckle connector 201. Similarly, or alternately, the first turnbuckle 194 may be removed from its position on the first sidewall extender 146 and instead be positioned in the angle formed between the ramp 150 and first sidewall extender 146. The first turnbuckle may be connected to one of the first turnbuckle connectors 195 and the first ramp turnbuckle connector 200. The first and second turnbuckles 194, 196 are preferably jaw and jaw turnbuckles which can be rotated to lock at a desired length. In the third step, the first and/or second turnbuckles 194, 196 may be engaged to lock at the desired length, to keep the angle of the ramp 150 relative to the cargo bed extender 122 from changing.

Figure 24:
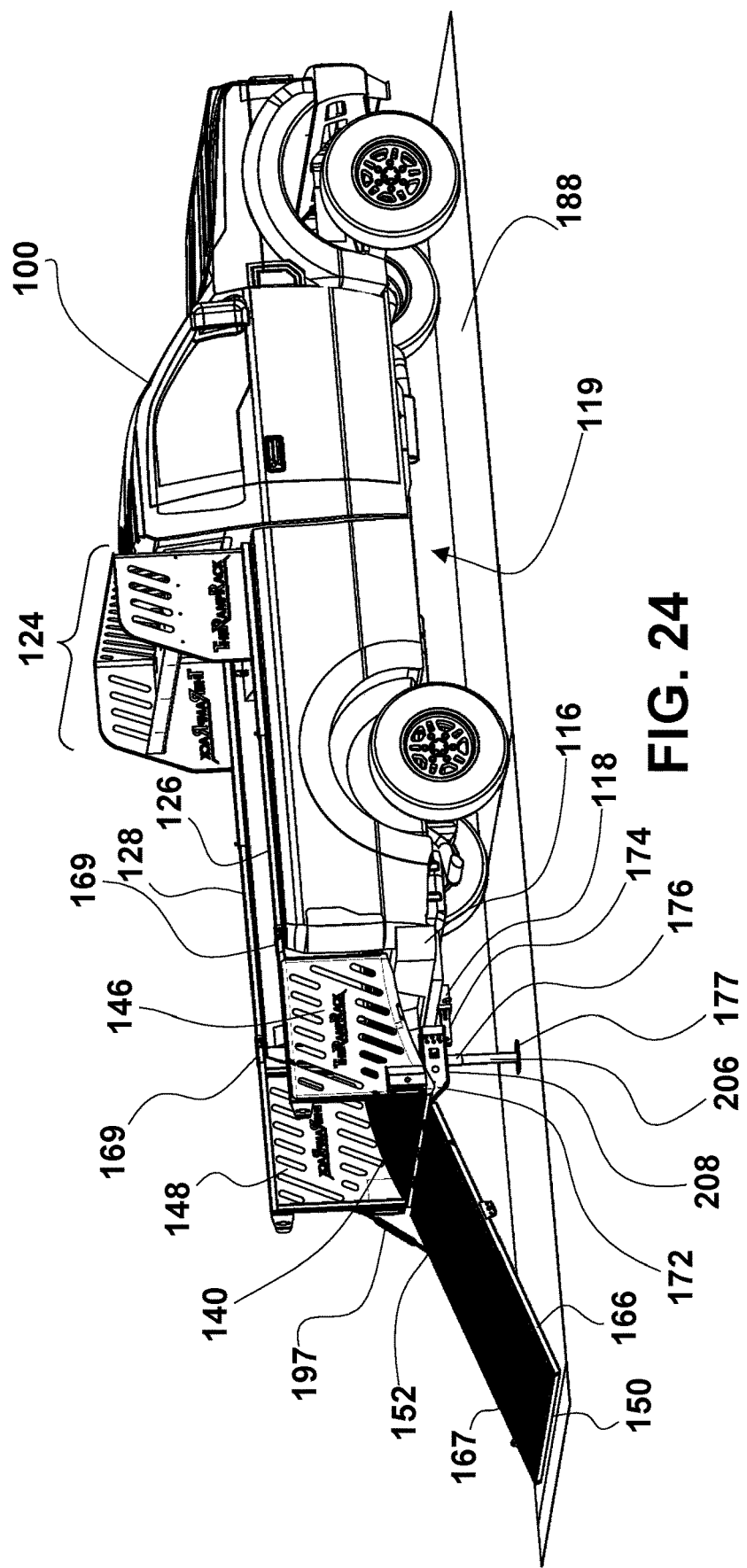

FIG. 24 is right side perspective view of the combination 119 vehicle 100 and convertible ramp body 120 of a preferred embodiment. The figure shows the fourth step of the method for detachably removing and storing the cargo bed extender 122 and ramp 150 separate from the rest of the combination 120. In the fourth step, the extendable leg 206 has be extended from within the telescoping rod 176 until the footer 177 contacts the support surface 188. The jack assembly 175 is preferably configured such that the extendable leg 206 may be carefully lowered and then locked at any desired length when the footer 177 contacts the support surface 188.

Figure 25:
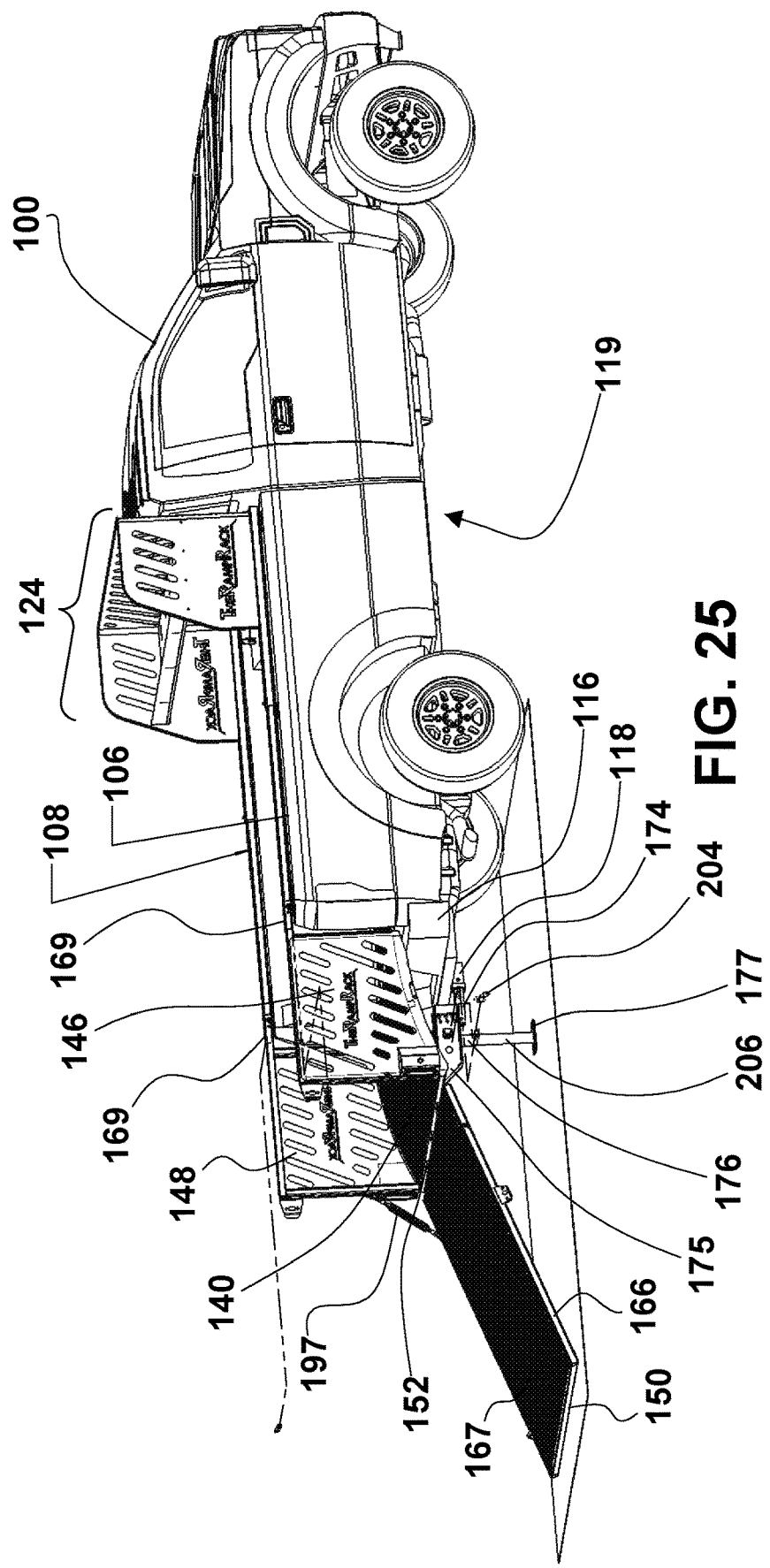

FIG. 25 is right side perspective view of the combination 119 vehicle 100 and convertible ramp body 120 of a preferred embodiment. The figure shows the fifth step of the method for detachably removing and storing the cargo bed extender 122 and ramp 150 separate from the rest of the combination 120. In the fifth step, the rack pin 204 is removed from the rack openings 202 and the vertical adjustment openings 212. However, the hitch pin 178 has not been removed from the towing bracket 118 and the pin holes 179. In such a configuration, the engagement portion of the connector 174 remains connect to the towing bracket 118 which being disconnected from the rest of the towing bracket connector 170.

Figure 26:
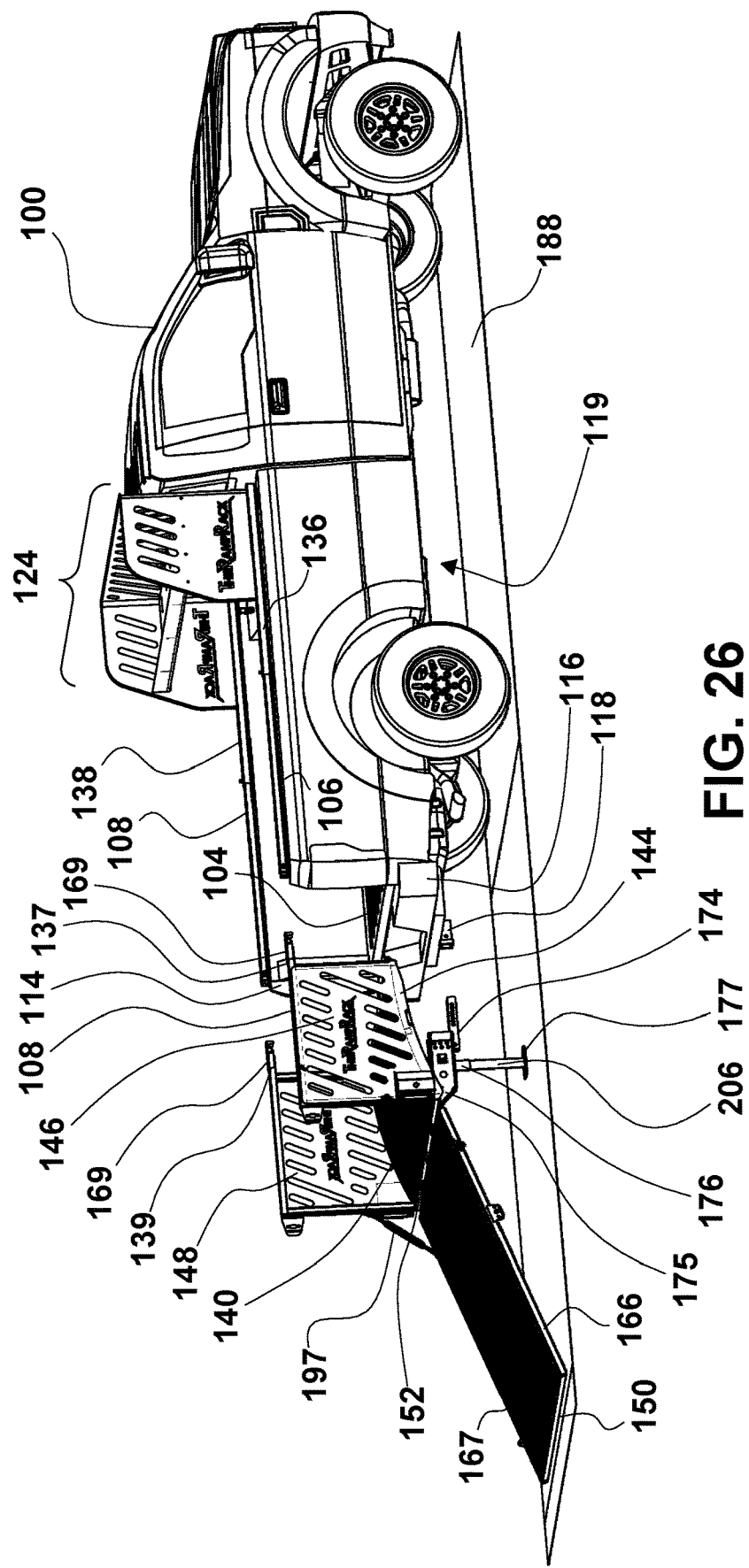

FIG. 26 is right side perspective view of the combination 119 vehicle 100 and convertible ramp body 120 of a preferred embodiment. The figure shows the sixth and final step of the method for detachably removing and storing the cargo bed extender 122 and ramp 150 separate from the rest of the combination 120. In the sixth step, the engagement brackets 169 are disconnected from the first and second sidewall beams 126, 128 and the vehicle 100 has been driven forward, removing the cargo bed extender 122 and ramp 150 from the rest of the combination 120. In some preferred methods, the engagement portion of the connector 174 may be left within the towing bracket 118. In other preferred embodiments, once the vehicle 100 has driven forward, the hitch pin 178 may be removed from the pin holes 179 and the towing bracket 118, leaving the engagement portion of the connector 174, the rack pin 204, and the hitch pin 178 all temporarily disconnected from the rest of the combination 120. A user preferably may then position the engagement portion of the connector 174 such that a preferred vertical adjustment opening 212 aligns with a preferred pair of rack openings 202, with the user then inserting the rack pin 204 therethrough. The user may further insert the hitch pin 178 through the pin holes 179 in the engagement portion of the connector 174, thus assembly the combination 120 in two separate pieces.

Figure 27:
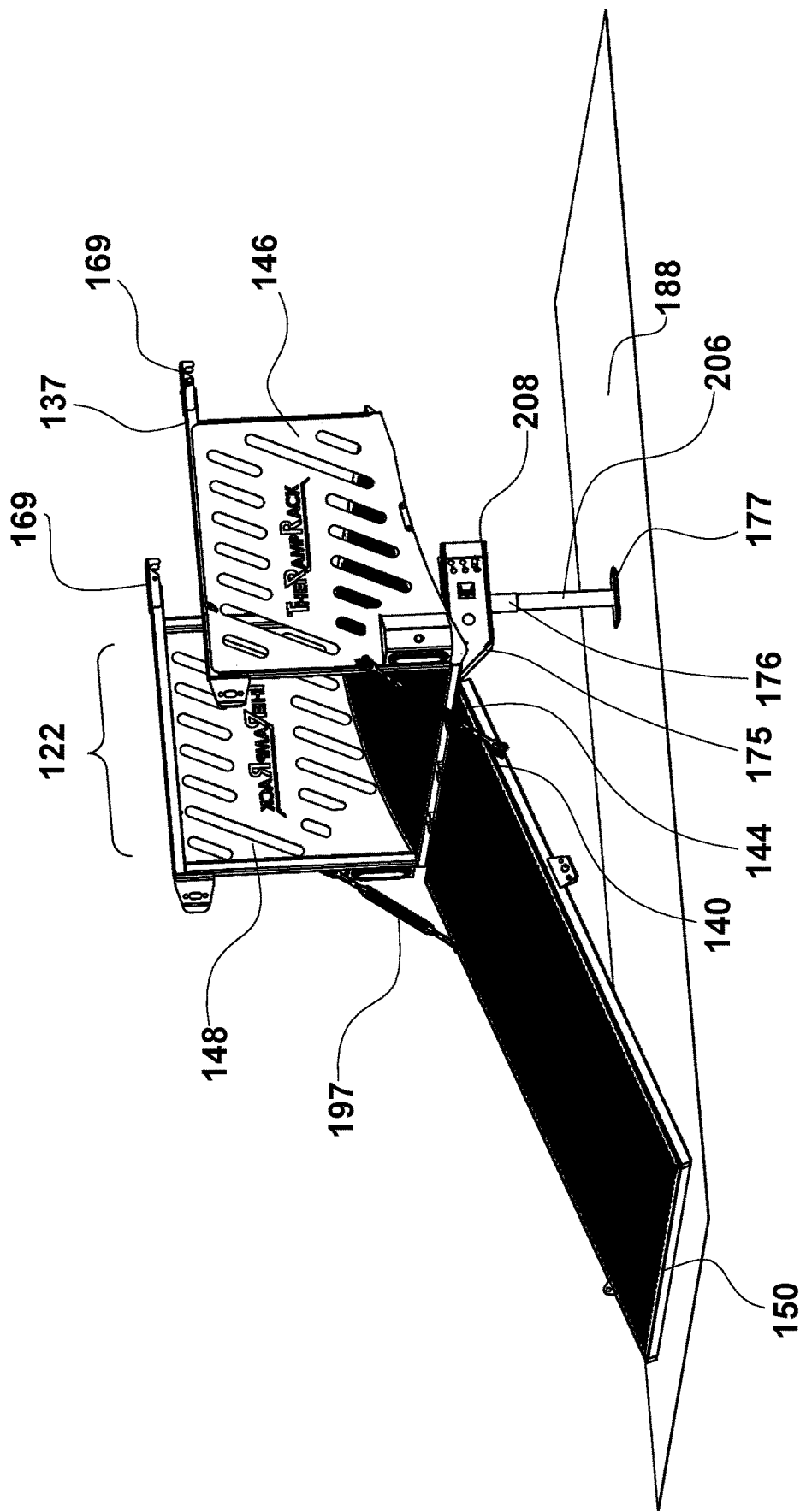

FIG. 27 is right side perspective view of the freestanding piece of the combination 120 that is not connected to the vehicle 100, specifically the cargo bed extender 122 and ramp 150. Only the ramp 150 and footer 177 come into contact with the support surface 188. The weight of this piece is placed on the ramp 150 (and transferred onto the first and/or second turnbuckles 194, 196) and the footer 177 (and transferred through the extendable leg 206, onto the telescoping rod 176, onto the connection cap 210, and finally onto the cargo bed extender frame 164). Such a configuration shows how the height of the roll-off portion 144, or support panel 144, relative to the transfer surface 188, or ground 188, is unchanged when the cargo bed extender 122 and ramp 150 are connected to a vehicle 100 and when they are freestanding. In this preferred embodiment, the engagement portion of the connector 174 remains connected to the towing bracket 118 of the vehicle 100.

DETAILED DESCRIPTION OF THE PREFERRED EMBODIMENT

Certain terminology is used in the following description for convenience only and is not limiting. The words "right," "left," "front," "forward," "back," "rear," "up," and "down" designate the directions as they would be understood by a person directly behind the convertible ramp body, vehicle, and/or combination. The words "outer" and "inner" refer to directions away from and toward, respectively, the geometric center of the cargo bed 102. "Lateral sides" refers to opposite ends of a component along a geometric horizontal axis of the convertible ramp body, vehicle, and/or combination, namely the right and left sides. "Axial sides" refers to opposite ends of a component along a geometric axis perpendicular to the horizontal axis, namely the front and rear ends. The terms "overlaying," "overlapping," or "covering," when used in connection with two surfaces is defined as meaning "being positioned anywhere between the actual touching of two surfaces to being in facing orientation and within one inch (or 2.54 centimeters) apart." Additionally, the words "a" and "one" are defined as including one or more of the referenced items unless specifically stated otherwise. The terminology includes the words above specifically mentioned, derivatives thereof, and words of similar import.

Referring to FIGS. 1-27, wherein like numerals indicate like elements throughout, there are shown preferred embodiments of a convertible ramp body 120, a vehicle 100, and a combination 119 thereof. The term "vehicle" used herein means any apparatus which may move a person, persons, objects, goods, etc., from one location to another. While a pick-up truck or similar vehicle is shown in the figures, those of ordinary skill in the art will appreciate from this disclosure that the invention may be used in connection and/or combination with any other vehicles, including cars, dump trucks, bulldozers, ATVs and four wheelers, horse or bike drawn carts, boats, train cars, airplanes, or any other suitable apparatus.

Referring to FIGS. 1 and 10, the vehicle 100 preferably includes a cargo bed 102 that has a bed floor 104 onto which objects may be placed for transport and about which the convertible ramp body 120 may be positioned. The cargo bed 102 is preferably distinguishable from other elements of the vehicle 100, such as the cab, undercarriage, wheels, and other parts unrelated to cargo storage. The bed floor 104 of the cargo bed preferably has a perimeter 105 defined by a horizontal sidewall 110 and bed opening 114 (which may contain a rear gate 113 detachably and rotatably positioned therein) on opposite axial ends, preferably the front and rear axial ends of the bed floor 104, respectively. The perimeter 105 of the bed floor 104 is preferably further defined by a first lateral sidewall 106 on one lateral side of the bed floor 104 (preferably the right side), and a second lateral sidewall 108 on the opposite lateral side of the bed floor 104 (preferably the left side). The first and second lateral sidewalls 106, 108 preferably each define some of a plurality of sidewall openings 112. The plurality of sidewall openings 112 are preferably holes in the upper surfaces or sides of the first and second lateral sidewalls 106, 108. The vehicle 100 preferable also includes a bumper 116 positioned proximate to the bed opening 114, and a towing bracket 118 positioned below the bumper 116 and configured to facilitate the towing of trailers. A pin hole 179 may be defined by the towing bracket 118 and configured to receive a hitch pin 178 which might secure an accessory, such as a trailer hitch, within the towing bracket 118. Those of ordinary skill in the art will appreciate from this disclosure that any suitable device for detachably securing accessories within the towing bracket 118 may be provided without exceeding the scope of this disclosure.

Referring to FIGS. 2-4 and 17-20, the convertible ramp body 120 and the combination 119 vehicle 100 and convertible ramp body 120, preferably includes a storage shelf body 124 on one axial end, preferably the front axial end, and a cargo bed extender 122 on the opposite axial end, preferably the rear axial end. The storage shelf body 124 and cargo bed extender 122 are preferably connected by a first sidewall beam 126 on one lateral side, preferably the right side, and a second sidewall beam 128 on the opposite lateral side, preferably the left side. The first and second lateral sidewall beams 126, 128 may each include some of a plurality of securing posts 130. The plurality of securing posts 130 are preferably extensions or protrusions configured to fit within corresponding members of the plurality of sidewall openings 112. The convertible ramp body 120 may also include a horizontal sidewall beam 132 configured to be positioned along the horizontal sidewall 110 and may form a portion of the shelf frame 134. In some preferred embodiments, the horizontal sidewall beam 132 may include some of the plurality of securing posts 130, and the horizontal sidewall 110 may include some of the plurality of sidewall openings 112. A ramp 150 is preferably connected to the cargo bed extender 122 via a pivotal connection 152, allowing the ramp 150 to rotate upward and downward about the pivotal connection 152.

The combination 119 is preferably formed by positioning the convertible ramp body 120 about the cargo bed 102 of the vehicle 100. Those of ordinary skill in the art will appreciate from this disclosure that the convertible ramp body 120 is said to be positionable about the cargo bed 102 because it preferably abuts and/or is positioned on top of and/or through different portions of the cargo bed 102. As will be discussed in more detail below, the first sidewall beam, for example, is preferably positioned on the first lateral sidewall 106 an includes some of a plurality of securing posts 130 which may be positioned within some of a plurality of sidewall openings 112 in the first lateral sidewall 106. The cargo bed extender 122 preferably abuts all of the first lateral sidewall 106, second lateral sidewall 108, and bed opening 114 and may be positioned on the bumper 116. The convertible ramp body 120 neither rests completely on, nor is positioned completely in, the cargo bed 102. Instead, it is positioned on and against portions of the cargo bed 102, and thus it is positioned about the cargo bed 102.

Critically, it is preferred that no part of the convertible ramp body 120 is formed by the rear gate 113 and that the convertible ramp body 120 does not adjacently overlay nor lay upon any portion of the bed floor 104 when the convertible ramp body 120 is positioned about the cargo bed 102 of the vehicle 100. In other words, the convertible ramp body 120 is not positioned directly on, or closely above the bed floor 104. This ensures that the effective area of the bed floor 104—the area upon which objects placed in the cargo bed 102 may rest—is not decreased or impeded by the convertible ramp body 120.

The vehicle 100 preferably includes a cargo bed 102 with a bed floor 104. The bed floor 104 preferably has a perimeter 105 defined by a horizontal sidewall 110 and a bed opening 114 positioned on opposite axial ends of the cargo bed 102. The bed opening 114 preferably does not have a rear gate 113 located therein. The perimeter 105 may be further defined by a first lateral sidewall 106 and a second lateral sidewall 108, positioned on opposite lateral ends of the cargo bed 102. The first and second lateral sidewalls 106, 108 preferably include a plurality of sidewall openings 112 in their respective top sides. The vehicle 100 may also have a bumper 116 positioned near the bed opening 114 and a towing bracket 118 positioned generally on or below the bumper 116.

The convertible ramp body 120 preferably has a storage shelf body 124 configured to be positioned on one axial end of the cargo bed 102, and a cargo bed extender 122 configured to be positioned on the opposite axial end of the cargo bed 102. Preferably, the storage shelf body 124 is positioned above the horizontal sidewall 110. Stated another way, it is preferred that the storage shelf body 124 is positioned farther from the bed floor 104, as measured planar perpendicularly, than any part of the horizontal sidewall 110 is. It is also preferred that the storage shelf body 124 is positioned farther from the bed floor 104, as measured planar perpendicularly, than any part of the first and second lateral sidewalls 106, 108. The cargo bed extender 122 is preferably positioned on the opposite axial end of the cargo bed 102 from the storage shelf body 124, with the cargo bed extender 122 thus being positioned adjacent to the bed opening 114.

Referring to FIGS. 7, 8, and 10, the cargo bed extender 122 preferably has a support panel 144 (also referred to herein as the roll-off portion) configured to increase an effective area of the cargo bed 102 of the vehicle 100 provide an expanded cargo bed. In other words, the cargo bed extender 122 is preferably configured to essentially make the cargo bed 102 larger, as such a configuration may be preferable for transporting rolling tools 190. In order to achieve this, it is preferred that the support panel 144 be attached to the vehicle 100 and to be positioned adjacent to and in general edge-to-edge alignment with the cargo bed 102 of the vehicle 100. A general edge-to-edge alignment may include the positioning of the support panel 144 within 6 inches (15.24 centimeters) higher or lower than the bed floor 104 and positioned within 24 inches (or 60.96 centimeters) of the bed opening 114 along a flat plane. A roll ledge 123 may be connected to a top side of the support panel 144 and configured to cover the space between the support panel 144 and bed floor 104 when the support panel 144 and bed floor 104 are in edge-to-edge alignment.

Preferably, the support panel 144 is formed by a first flooring section 140 overlaying a cargo bed extender frame 164. When viewed from behind, the cargo bed extender 122 preferably has a U-shape, with the sides of the U formed by the first and second sidewall extenders 146, 148 and the bottom of the U formed by the support panel 144. When viewed in cross-section across a vertical axis, however, the support panel 144 preferably has an arcuate curvature. In other words, the support panel 144 (and, accordingly, the first flooring section 140) is curved, sloping downward from its front side, proximate to the cargo bed 102, to its rear side, where the ramp 150 may be connected via a pivotal connection 152. Phrased another way, the support panel 144 has first and second support panel ends, with the first support panel end (the end proximate to the ramp 150) being vertically closer to the ground 188 (also referred to herein as a transfer surface 188) than the second support panel end (the end proximate to the cargo bed 102). The second support panel end is preferably position generally at a same vertical distance above the ground 188 as the bed floor 104 of the cargo bed 102 of the vehicle 100. While it is preferred that the second support panel end is generally positioned a same vertical distance above the ground 188 as the cargo bed 102 of the vehicle 100, "generally positioned a same vertical distance above the ground 188" refers to being position within 6 inches (or 15.24 centimeters) above or below the exact same distance. Those of ordinary skill in the art will appreciate from this disclosure that any positioning within this 12 inch (or 30.48 cm) range constitutes generally a same vertical distance.

In other preferred embodiments, such as the one shown in FIG. 8, the cargo bed extender 122 may include a vertical support portion 154 having a first flooring section 140 and a roll-off portion 144 having a second flooring section 142. The cargo bed extender 122 preferably further includes a first sidewall extender 146 and second sidewall extender 148, each extending upward perpendicularly from the first flooring section 140 and second floorings section 142. Preferably the first sidewall extender 146 and second sidewall extender 148 each directly abut the first and second lateral sidewalls 106, 108 respectively. Similarly, it is preferred that the vertical support portion 154 abuts the bed opening 114 and is positioned generally above, although it may rest directly on, the bumper when the convertible ramp body 120 is positioned about the cargo bed 102. Preferably, no part of the convertible ramp body 120 is formed by the rear gate 113 of the vehicle 100, which preferably would be removed from the bed opening 114 prior to placing the convertible ramp body 120 about the cargo bed 102. The cargo bed extender 122 may also include a towing bracket connector 170 extending downward therefrom to connect to the towing bracket 118 and further connect the convertible ramp body 120 to the vehicle 100. Preferably, this positions the first flooring section 140 above the bumper 116.

It is preferred that the convertible ramp body 120 does not adjacently overlay nor lay upon any portion of the bed floor 104 when the convertible ramp body 120 is positioned about the cargo bed 102 of the vehicle 100. In other words, the convertible ramp body 120 is not positioned directly on, or closely above, the bed floor 104. This ensures that the effective area of the bed floor 104—the area upon which objects placed in the cargo bed 102 may rest—is not decreased or impeded by the convertible ramp body 120. Phrased another way, the convertible ramp body 120 preferably occupies no portion of the bed floor 104 that could be used for storing rolling tools 190, nor occupies any space which may be required for loading rolling tools 190 into the cargo bed 102. In some preferred embodiments, the convertible ramp body 120 may include a roll ledge 123 which bridges any gap between the first flooring section 140 and the bed floor 104. While the roll ledge 123 may overlay a small portion of the bed floor 104, this amount is preferably less than 5% of the total bed floor 104 area.

Preferably, the cargo bed extender 122 and the storage shelf body 124 are connected by, and located on opposite ends of, the first and second sidewall beams 126, 128. The first sidewall beam 126 is preferably positioned at least partially on top of the first lateral sidewall 106 and the second sidewall beam 128 is preferably positioned at least partially on the second lateral sidewall 108. The first and second sidewall beams 126, 128 are preferably formed of straight and rectangular prismatic members which may be able to sit generally flat on top of the first and second lateral sidewalls 106, 108 respectively. Similarly, the horizontal sidewall beam 132 is also preferably formed of straight and rectangular prismatic members which may be able to sit generally flat on top of the horizontal sidewall 110. Those of ordinary skill in the art will appreciate from this disclosure that the first and second sidewall beams 126, 128 and the horizontal sidewall beam 132 may be provided in any suitable shape, including an L-shape, a U-shape, a V-shape, a cylinder, or any other suitable shape.

The first sidewall beam 106, second sidewall beam 108, and or the horizontal sidewall beam 132 may include some of a plurality of securing posts 130 attached thereto. These securing posts 130 are preferably roughly perpendicular protrusions configured to fit into corresponding members of the plurality of sidewall openings 112, holes or opening in the first lateral sidewall 106, second lateral sidewall 108, and/or horizontal sidewall 110. The combination of the plurality of securing posts 130 and plurality of sidewall openings 112 is configured to secure the position of the convertible ramp body 120 about the cargo bed 102, specifically to keep the convertible ramp body 120 from shifting along a two-dimension plane.

The combination 119 preferably further includes a ramp 150 connected to the cargo bed extender 122 by a pivotal connection 152 which allows the ramp 150 to rotate upward and downward about the pivotal connection 152. The pivotal connection 152 is preferably formed of two hook connectors positioned on the ramp frame 166 of the ramp 150, and two guide sections positioned one the cargo bed extender frame 164. The two hook connectors may engage the two guide sections to form the pivotal connection 152. Those of ordinary skill in the art will appreciate from this disclosure that any suitable connection may be provided, positioned on either or both of the ramp frame 166 and cargo bed extender frame 164, to form the pivotal connection 152. The ramp 150 is preferably formed of a ramp frame 166 with a ramp floor 167 positioned thereon. The ramp frame 166 preferably forms a perimeter of the ramp 150 to define the shape of the ramp 150 and to increase its stability, while the ramp floor 167 is configured for allowing rolling tools 190 or other objects to roll on and over it. The ramp frame 166 and/or cargo bed extender 122 may also include ramp lock 192 to secure the ramp 150 in an upward position. The ramp frame 166 may also include a first ramp buckle connector 200 positioned on one lateral side of the ramp 150 positioned proximate to the first sidewall extender 146 and a second ramp buckle connector 201 positioned on the opposite lateral side of the ramp 150 positioned proximate to the second sidewall extender 148. The first ramp buckle connector 200 is preferably configured such that the first turnbuckle 194 can be connected thereto while also being connected to one of the first turnbuckle connectors 195 on the outside of the first sidewall extender 146, and the second ramp buckle connector 201 is preferably configured such that the second turnbuckle 196 can be connected thereto while also being connected to one of the second turnbuckle connectors 197 on the outside of the second sidewall extender 148.

The ramp 150, particularly in connection with the pivotal connection 152, is configured to rotate between two positions. The first position is a downward position, wherein the free end of the ramp 150 rests on a transfer surface 188. In the first position, the ramp floor 167 faces generally upward and away from the cargo bed 102 and the weight of the ramp 150 is distributed between the transfer surface 188, the towing bracket 118 (via the towing bracket connector 170) and the pivotal connection 152. The second position is an upward position, where the ramp 150 is rotated upward until it either on of contacts the cargo bed extender 122 or the ramp lock 190. In the second position, the upward position, the ramp floor 167 generally faces toward the cargo bed 102 and the weight of the ramp 150 is fully placed on the towing bracket 118 (via the towing bracket connector 170) and the pivotal connection 152. It is preferred that the ramp frame 166 it is at least as wide as, and preferably wider than, the cargo bed extender frame 164 such that the ramp 150 cannot rotate past the cargo bed extender 122. This configuration helps to ensure the ramp 150 does not cover or overlay any portion of the bed floor 104.

Referring to FIGS. 6 and 14-16, the storage shelf body 124 preferably includes a shelf frame 134 which defines the rough shape of the storage shelf body 124. This is distinguishable from the shelf flooring section 143, a flat section of the storage shelf body 124 configured to be held roughly horizontally flat to allow items to be positioned and stored thereon. The shelf flooring section 143 is further preferably held parallel or roughly parallel (that is, within 30 degrees of true parallel and more preferably within 15-degrees of true parallel) to the bed floor 104. The shelf flooring section 134 is preferably formed of a thin layer of braided metal or sheet metal, preferably covered by a coating designed to prevent rust or corrosion. This coating may include paint, rubber, enamel, or any other suitable material. The shelf frame 124, conversely, is preferably formed of flat, L-shaped, or rectangular prismatic metal members, with the metal preferably being suitably thick to allow the storage shelf body 124 to provide some counterweight to the ramp 150 held along the front axial end of the cargo bed 102 proximate to the cab of the vehicle 100. The storage shelf body 124 may also be connected to the cargo bed 102 by a plurality of mounting brackets 168 attached to the shelf frame 135 and screwed or bolted to the first lateral sidewall 106, second lateral sidewall 108, horizontal sidewall 110 and/or any other part or parts of the cargo bed 102.

The shelf frame 134 preferably includes along its lower portion a horizontal sidewall beam, 132 preferably positioned on the horizontal sidewall 110, a shelf portion of the first sidewall beam 136 positioned partially on the first lateral sidewall 106, and a shelf portion of the second sidewall beam 138 positioned partially on the second lateral sidewall 108. The shelf portion of the first sidewall beam 136 may be connected to the first lateral sidewall 106 by one of a plurality of engagement brackets 169 and, similarly, the shelf portion of the second sidewall beam, 138 may be connected to the second lateral sidewall 108 by another of the plurality of engagement brackets 169.

Preferably, the shelf frame 134 also includes shelf support posts 162 extending upward roughly perpendicularly from any or all of the horizontal sidewall 110, the shelf portion of the first sidewall beam 136, and/or the shelf portion of the second sidewall beam 138. The shelf support posts 162 are preferably configured to provide vertical support to the shelf flooring section 143 so that it does not collapse downward from its own weight and/or from the weight of objects placed thereon. Preferably, the first shelf support post 162 extends upward from the right side corner of the shelf frame 134 where the horizontal sidewall 110 and the shelf portion of the first sidewall beam 136 meet at a 90 degree angle and are preferably connected by a weld, and the second shelf support post 162 extends upward from the left side corner of the shelf frame 134 where the horizontal sidewall 110 and the shelf portion of the second sidewall beam 138 meet at a 90 degree angle and are also preferably connected by a weld. A third shelf support post 162 preferably extends upward from a portion of the a shelf portion of the first sidewall beam 136 such that it is positioned above the first lateral sidewall 106, and a fourth shelf support post 162 preferably extends upward from a portion of the shelf portion of the second sidewall beam 138 such that it is positioned above the second lateral sidewall 108. Roughly halfway up the shelf support posts 162, a shelf support arm 163 is preferably positioned running roughly perpendicular to the shelf support posts 162. In a preferred embodiment, the shelf support arm 163 is preferably positioned between the third and fourth shelf support posts 162 and holds the shelf flooring section thereon 143. It is further preferred that the shelf support arm 163 is configured such that the entire shelf support arm 163 and a portion of the shelf flooring 143 are positioned directly above a portion of the bed floor 104. However, in this preferred configuration, it is preferred that the shelf support arm 163 and shelf flooring section 143 are located farther from the bed floor 104, as measured planar perpendicularly, than any of the horizontal sidewall 110, the first lateral sidewall 106, and the second lateral sidewall 108.

In some preferred embodiments, the shelf flooring section 143 may be connected on its lateral and front sides only by welds to the shelf support posts 162. However, in other preferred embodiments, the shelf flooring section 143 may be connected on its lateral sides to the first shelf sidewall 156 and second shelf sidewall 158, as well as to a horizontal shelf sidewall 160 on its front side. The first shelf sidewall 156 and second shelf sidewall 158 are preferably positioned on opposite lateral ends of the storage shelf body 124 (and, similarly, of the cargo bed 102), and the horizontal shelf sidewall 160 is preferably positioned on an axial end of the storage shelf body 124 (and, similarly, of the cargo bed 102). The first shelf sidewall 156, second shelf sidewall 158, and horizontal shelf sidewall 160 are preferably formed of a solid or semi-solid member, such as sheet metal, braided metal, bars, mesh, etc. There is preferably no sidewall on the inner axial end of the storage shelf body 124, where the shelf support arm 163 is preferably located. This configuration is intended to allow for easy loading of the storage shelf body 124, and further ensuring that handheld tools 186 or other items placed on the storage shelf body 124 can only fall into the cargo bed 102 if they become dislodged from the shelf flooring section 143.

In other preferred embodiments, the shelf frame 134 may also include first and second sidewall arms and a horizontal sidewall arm, all positioned on the same horizontal plane as the shelf support arm 164. In such embodiments, the shelf flooring section 143 may rest on all of the shelf support arm 163, the first and second sidewall arms, and the horizontal sidewall arm. In still other preferred embodiments, the top of the shelf frame 134 may include a first shelf sidewall cap, a second shelf sidewall cap, and a horizontal shelf sidewall cap. These elements are preferably solid, flat beams which may cover the tops of the shelf support posts 163 and of the first shelf sidewall 156, second shelf sidewall 158, and horizontal shelf sidewall 160, and may connect to them via welds to provide additional stability to the storage shelf body 124. Preferably, there is no cap positioned above the shelf support arm 163.

Referring to FIGS. 7, 8, and 10, the cargo bed extender 122 preferably includes a cargo bed extender frame 164 that gives shape and stability to the cargo bed extender 122. The cargo bed extender frame 164 is roughly U-shaped when viewed from behind, with the lower portion of the cargo bed extender frame 122 providing support for the first and/or second flooring sections 140, 142, with the sides forming support for the first sidewall extender 146 and second sidewall extender 148. The cargo bed extender frame 164 is preferably made of steel or metal beams in L- or U-shapes and/or flat beams.

The cargo bed extender 122 preferably forms a support panel 144 (also referred to herein as the roll-off portion 144) configured to increase an effective area of the cargo bed 102 of the vehicle 100. Preferably, the support panel 144 is formed by a first flooring section 140 overlaying a cargo bed extender frame 164. When viewed from behind, the cargo bed extender 122 preferably has a U-shape, with the sides of the U formed by the first and second sidewall extenders 146, 148 and the bottom of the U formed by the support panel 144. When viewed in cross-section across a vertical axis, however, the support panel 144 preferably has an arcuate curvature. In other words, the support panel 144 (and, accordingly, the first flooring section 140) is curved, sloping downward from its front side, proximate to the cargo bed 102, to its rear side, where the ramp 150 may be connected via a pivotal connection 152. Phrased another way, the support panel 144 has first and second support panel ends, with the first support panel end (the end proximate to the ramp 150) being vertically closer to the ground 188 (also referred to herein as a transfer surface 188) than the second support panel end (the end proximate to the cargo bed 102). The second support panel end is preferably position generally at a same vertical distance above the ground 188 as the bed floor 104 of the cargo bed 102 of the vehicle 100.

In other preferred embodiments, such as the one shown in FIG. 8, the cargo bed extender frame 164 preferably defines a perimeter of a rectangular shape and is preferably bent at an angle, with the center of one set of parallel sides meeting at an angular connection. A bar is preferably positioned at the angular connection and is connected to both of said parallel sides. This allows the cargo bed extender frame 164 to provide additional support to the angular connection. It is preferred that these portions of the cargo bed extender frame 164 be formed or rectangular prismatic steel beams. The pivotal connection 152, to which the ramp 150 may be connected, is preferably positioned on the cargo bed extender frame 164 proximate to the roll-off portion 144.

In some preferred embodiments, the cargo bed extender frame 164 has an arcuate curve shape to give the support panel 144 its shape. In other preferred embodiments, the cargo bed extender frame 164 is preferably bent at a 160-degree angle about the angular connection. That is, the portion of the cargo bed extender frame 164 on one side of the angular connection is positioned at approximately 160 degrees relative to the other side, when measured from the underside of the cargo bed extender frame 164. Viewed from above, the angle would preferably be 200 degrees. It is generally preferred that the angle, when measured from below, is any angle greater than ninety degrees. While angles between 145 and 175 degrees are further preferred, those of ordinary skill in the art will appreciate from this disclosure that any suitable angle may be used.

In this preferred embodiment, a first flooring section 140 is preferably positioned on the cargo bed extender frame 164 on only one side of the angular connection and is connected to portions of the perimeter of the rectangular shape. The second flooring section 142 is preferably positioned on the opposite side of the angular connection and is also connected to portions of the perimeter of the rectangular shape. Such a configuration positions the first flooring section 140 and second flooring section 142 at different angular planes. The first flooring section 140 preferably forms the vertical support portion 154, and the portion with the second flooring section 142 preferably forms the roll-off portion 144.

In some preferred embodiments, two or more axial beams may also be included as part of the cargo bed extender frame 164. These are preferably positioned across the cargo bed extender frame 164 and preferably correspond to the placement of the pivotal connection 152 on the cargo bed extender frame 164. These may also roughly correspond to the position of the guide sections on the ramp 150.

The cargo bed extender frame 154 preferably also includes first and second sidewall extenders 146, 148 which form the vertical portions of the rough U-shape of the cargo bed extender frame 164. The second sidewall extender 148 is preferably roughly a mirror-image shape compared to the first sidewall extender 146. Thus, statements regarding the shape of the first sidewall extender 146 may also apply to the second sidewall extender 148. For the purposes of clarity, descriptions of shape will be limited to discussing the first sidewall extender 146.

The first sidewall extender 146 preferably has a unique shape, with a flat upper side and a lower end bent or curved to correspond to the shape of the support panel 144. Thus, if the bottom portion of the cargo bed extender frame is bent at a 160-degree angle, as discussed above, the lower end of the first sidewall extender 146 will also turn at a 160-degree angle. In order to keep the top side of the first sidewall extender 146 flat despite the curved under side, the inner axial end of the first sidewall extender 146 is preferably longer than the outer axial end of the first sidewall extender 146. The outer axial end of the first sidewall extender 146 may also include the ramp lock 192. The outer major surface of the first sidewall extender 146 may include one of more first turnbuckle connectors 195 for connecting a first turnbuckle 194 thereto.

In some preferred embodiments, the upper end of the first sidewall extender 146 may include a bed extender portion of the first sidewall beam 137 which is positioned partially above the first lateral sidewall 106 and may be connected to the first sidewall beam 126, preferably by one of a plurality of engagement brackets 169. The engagement brackets 169 may be configured to detachably connect to the first and/or second sidewall beams 126, 128 and preferably allow for them to be connected and disconnected without the use of tools. As the second sidewall extender 148 may preferably be formed of a similar shape in a mirror-image, the second sidewall extender 148 may also include on its upper end a bed extender portion of the second sidewall beam 139 which is positioned partially above the second lateral sidewall 108 and may be connected to the second sidewall beam 128, preferably by one of a plurality of engagement brackets 169. The second sidewall extender 148 may also include a ramp lock 192, which may be provided in addition to, or used in connection with, a ramp lock 192 positioned on the first sidewall extender 146. The outer major surface of the second sidewall extender 148 may include one of more second turnbuckle connectors 197 for connecting a second turnbuckle 196 thereto.

Preferably, the top side and outer axial side of the first sidewall extender 146 (and the second sidewall extender 148) are formed of rectangular prismatic metal bars, and the inner axial side and lower side are preferably formed of L-shaped metal beams. The first sidewall extender 146 (and second sidewall extender 148) preferably further includes a sidewall formed by metal sheeting or braided metal, matching the preferred material for the first and second flooring sections 140, 142.

In those preferred embodiments in which the cargo bed extender 122 has a distinct angle, the angular connection preferably distinguishes the vertical support portion 154 from the roll-off portion 144. The vertical support portion 154, which includes the first flooring section 140, is preferably configured to be held roughly parallel to the bed floor 104 and close enough to form a nearly contiguous surface for storage with the bed floor 104. The vertical support portion 154, being nearly contiguous with the bed floor 104, may increase the "effective area" of the bed floor 104. For example, rolling tools 190 like a large tractor may be too long to rest on the bed floor 104. In other words, the bed floor 104 may have an effective area that is too small for the tractor. The vertical support portion 154 may increase this area such that the tractor may rest on both the bed floor 104 and a portion of the vertical support portion 154. Thus, the vertical support portion 154 has increased the effective area of the bed floor 104. Critically, while the cargo bed extender 122 may abut the cargo bed 102, the cargo bed extender 122 preferably does not cover or overlay any portion of the bed floor 104 or rear gate 113, nor is any portion of the cargo bed extender 122 formed by the rear gate 113. The roll-off portion 144 is configured to create an easier transition to the ramp 150. In some preferred configurations, a roll ledge 123 may be included to bridge any gap between the cargo bed extender 122 and the cargo bed 102 to further ease the transition between the cargo bed 102 and the ramp 150.

Referring to FIGS. 6, 9, 11-13 and 27, the cargo bed extender 122 preferably also includes a towing bracket connector 170. The towing bracket connector 170 preferably extends downward from the cargo bed extender frame 164, and is preferably connected to some portion or portions thereof. In some preferred embodiments, the towing bracket connector 170, and specifically the spacer portion 172 may be connected to the perimeter of the cargo bed extender frame 164 or to the bar at the angular connection. In other preferred embodiments, the towing bracket connector 170 it may be connected to at least one of the first flooring section 140 or second flooring section 142.

The towing bracket connector 170 preferably includes at least one spacer portion 172 and an engagement portion 174, with the at least one spacer portion 172 being connected to the engagement portion 174. In some preferred embodiments, the towing bracket connector 170 may form a rough L-shaped, with the spacer portion 172 extending downward and being connected to the engagement portion 174 at approximately a 90-degree angle, and the engagement portion 174 configured to be inserted into the towing bracket 118 of the vehicle 100. In such an embodiment, the spacer portion 172 ensures that the cargo bed extender 122 sits above the bumper 116. In some preferred embodiments, the position of the connection of the spacer portion 172 and engagement portion 174 on either or both of these elements may be adjustable to allow the position of the convertible ramp body 120 about the cargo bed 102 to be adjusted.

In other preferred embodiments, the convertible ramp body 120, and specifically the towing bracket connector 170, further includes a jack assembly 175 (simple referred to in the claims and herein as the jack 175) positioned on the bottom side of the support panel 144 which can be extended to contact the ground 188, or the transfer surface 188. A first spacer portion 172 and/or a second spacer portion 173 extending from the cargo bed extender frame 164 may be connected to the jack assembly 170 on the inside of and being sandwiched between the jack plates 208. The first spacer portion 172 is preferably held at a diagonal positions while the second spacer portion 173 is preferably held at a roughly vertical position, being perpendicular relative to the ground 188.

Preferably, when the ramp 150 is fixed in position relative to the support panel 144 and in the ground contacting position, the jack 175 may be put in contact with the ground 188 to support the cargo bed extender 122 above the ground 188 by the ramp 150 and the jack 175. This configuration preferably allows the ramp 150 and the cargo bed extender 122 to be freestanding relative to the rest of the combination 119.

The towing bracket connector 170 preferably includes a first spacer portion 172 extending diagonally downward from the cargo bed extender frame 164 and a second spacer portion 174 extending roughly straight downward from the cargo bed extender frame 164. The first and second spacer portions 172, 174 preferably both connect to a jack assembly 175. The jack assembly 175 is preferably formed of at least one jack plate 208 surrounding a telescoping rod 176 at least partially containing an extendable leg 206 ending in a footer 177 configured to contact the transfer surface 188. The portion of the telescoping rod 176 farthest from the footer 177 preferably forms a connecting cap 210 configured to connect to a portion of the cargo bed extender frame 164. The jack assembly 175, also referred to herein as the jack 175, may also include cross plates 214 that run perpendicularly to the jack plates 208 and pass through the jack plates 208 while squeezing the telescoping rod 176. This preferably provides increased support to the telescoping rod 176. The portion of the jack assembly 175 closest to the towing bracket 118 may connect to the engagement portion 174 of the towing bracket connector 170. The jack plate 208 may include a plurality of rack openings 202 configured to correspond to vertical adjustment openings 212 in the engagement portion 174. By raising or lowering the engagement portion 174 until it aligns with a preferred rack opening 202, a user may adjust the height of the engagement portion 174 relative to the cargo bed extender frame 164. Once the desired height is reached, a rack pin 204 may be inserted through the rack opening 202 and vertical adjustment opening 212 to secured them in place. The rack pin 204 may pass through some of the rack openings 202 and vertical adjustment openings 212 to adjust the height of the engagement portion 174 relative to the cargo bed extender frame 164, as this may allow the towing bracket connector 170 to ensure that the support panel 144 is held at generally the same height relative the support surface 188 as the bed floor 104. In some preferred embodiments, a plurality of pin holes 179 may run through the towing bracket 118 and/or towing bracket connector 170, and a hitch pin 178 may be inserted therethrough to detachably secure the towing bracket connector 170 inside the towing bracket 118. The jack assembly 175 may include an extension drive mechanism, such as a hand crank or motor, to drive the lowering of the extendable leg 206 until the footer 177 reaches the support surface 188.

In some preferred embodiments, the combination 119 vehicle 100 and convertible ramp body 120 may include a means for detachably securing the engagement portion 174 within the towing bracket 118 of the vehicle 100. The towing bracket 118 and engagement portion 174 may combine to define a pin hole 179 which passes fully through both the towing bracket 118 and engagement portion 174. When these elements are aligned to fully open the pin hole 179, a hitch pin 178 may be inserted therethrough to keep the engagement portion 174 from sliding out of the towing bracket 118. In some preferred embodiments, the hitch pin 178 may be straight while in other embodiments it may be bent or crimped to further secure its position. Those of ordinary skill in the art will appreciate from this disclosure that any suitable locking means may be provided.

Referring to FIGS. 2-3, 9, and 17-21, the ramp 150 is preferably connected to the cargo bed extender 122 by a pivotal connection 152 which may allow the ramp 150 to rotate upward and downward about the pivotal connection 152. The pivotal connection 152 is preferably formed of interlocking connector pieces positioned on any or both of the ramp 150 and/or the cargo bed extender 122. In some preferred embodiment, two hook connectors positioned on the ramp frame 166 of the ramp 150, and two guide sections positioned one the cargo bed extender frame 164. The two hook connectors may engage the two guide sections to form the pivotal connection 152. Those of ordinary skill in the art will appreciate from this disclosure that any suitable connection may be provided, positioned on either or both of the ramp frame 166 and cargo bed extender frame 164, to form the pivotal connection 152.

The ramp 150 preferably includes a ramp frame 166 with a ramp floor 167 positioned thereon. The ramp frame 166 preferably forms a perimeter of the ramp 150 to define its shape and increase stability, while the ramp floor 167 is configured for rolling tools 190 or other objects to roll over it. The ramp frame 166 preferably also includes guide struts running axially which correspond to the rough position of wheels on rolling tools 190, to provide greater support to the ramp floor 167 when rolling tools 190 are moved up the ramp 150. Those of ordinary skill in the art will appreciate from this disclosure that any suitable configuration of beams may form the ramp frame 166 without exceeding the scope of this disclosure. The ramp frame 166 is preferably of strong metal or steel beams, which may be flat, cylindrical, rectangular prismatic, U- or L-shaped, or any other suitable shape. It is preferred that, when the ramp 150 is in the lowered position, the ramp frame 166 contacts the transfer surface 188.

The ramp frame 166 may also include some portions of the pivotal connection 152 attached thereto. The ramp frame 166 may further also include either the ramp lock 192 or an engagement segment for engaging the ramp lock 192, which may secure the ramp 150 in an upward position.

The ramp 150, particularly in connection with the pivotal connection 152, is configured to rotate upward and downward between two positions. The ramp 150 is preferably moveable between a ground contacting position, to extend between the ground 188 and the cargo bed extender 122, and a blocking position, such that the ramp 150 forms a gate for an end of the cargo bed 104 which may secure rolling tools 190 within the cargo bed 102 when the vehicle 100 is moving. The ground contacting position may also be referred to herein as the downward position, wherein the free end of the ramp 150 rests on a transfer surface 188. The blocking position may also be referred to herein as the upward position or the fully upright position, where the ramp 150 is rotated upward until it either on of contacts the cargo bed extender 122 or the ramp lock 190. In the upward position, the weight of the ramp 150 is fully placed on the pivotal connection 152. It is preferred that the ramp frame 166 it is at least as wide as, and preferably wider than, the cargo bed extender frame 164 such that the ramp 150 cannot rotate past the cargo bed extender 122. This configuration helps to ensure the ramp 150 does not cover or overlay any portion of the bed floor 104.

Referring to FIGS. 9 and 27, the ramp frame 166 may further include a first ramp buckle connector 200 positioned on a lateral end thereof proximate to the first sidewall extender 146 and a second ramp buckle connector 201 positioned on the opposite lateral end proximate to the second sidewall extender 148. The first and second ramp buckle connectors 200, 201 are preferably configured to connect to one end of the first turnbuckle 194 and second turnbuckle 196, respectively, while the first turnbuckle 194 is connected to one of the first turnbuckle connectors 195 and/or the second turnbuckle 196 while it is connected to one of the second turnbuckle connectors 197. The first and second turnbuckles 194, 196 are preferably formed of steel jaw and jaw turnbuckles which have an adjustable length that can be locked at a desired length. However, those of ordinary skill in the art will appreciate from this disclosure that any suitable strong, adjustable support may form the first and second turnbuckles 194, 196 without exceeding the scope of this disclosure.

The first and second turnbuckles 194, 196 are preferably configured to help the ramp 150 to support the cargo bed extender 122 when it is freestanding from the rest of the combination 120. In some preferred embodiments, the ramp 150 and cargo bed extender 122 may be removed from the rest of the combination 119 convertible ramp body 120 and vehicle 100 and allowed to stand on its own, elevated from the ground 188 (also referred to as the transfer surface 188). Preferably, the support panel 144, or roll-off portion 144, remains generally at the same height as the bed floor 102 when it is freestanding and when it is connected to the rest of the combination 119. In other words, it is preferred that the height of the support panel 144 is generally unchanged whether the support panel 144 is engaged with a vehicle 100 or freestanding. The term "generally unchanged" when used herein refers to remaining within 6 inches (15.24 centimeters) higher or lower than the other position.

When the ramp 150 and cargo bed extender 122 are freestanding, a significant portion of the weight thereof is placed on the footer 177 via the jack assembly 175. However, in order to increase stability, the angular position of the ramp 150 relative to the cargo bed extender 122 must be secured. The first and second turnbuckles 194, 196 preferably lock the ramp 150 in said angular position, thus allowing some of the weight of the ramp 150 and cargo bed extender 122 to be distributed to the ramp frame 166. Preferably, only the ramp 150 and footer 177 come into contact with the support surface 188. The weight of this piece is placed on the ramp 150 (and transferred onto the first and/or second turnbuckles 194, 196) and the footer 177 (and transferred through the extendable leg 206, onto the telescoping rod 176, onto the connection cap 210, and finally onto the cargo bed extender frame 164).

Referring to FIGS. 18, the convertible ramp body 120 may also include at least one sidewall hanging rack 180 positioned on the first sidewall beam 126 and/or on the second sidewall beam 128. In some preferred embodiments, the first and second sidewall beams 126, 128 may include a first and second sidewall hanging rack 180, 182 respectively. The at least one sidewall hanging rack 180 is preferably formed of vertically extending bars with a plurality of hooks 184 for receiving and holding handheld tools 186 thereon. While the term hooks 184 is used, the term is not meant to have be limiting to a curved protrusion ending in a point. Rather, hooks 184 refers to any suitable means for securing items, such as handheld tools 186 or ladders, to the convertible ramp body 120, including hook-and-loop fasteners, zipper lock or ties, bungees, or any other such means. Handheld tools 186 may refer to lawn trimmers, edgers or weedwackers, vacuum cleaners, chalk line reels, digging bars, rakes, shovels, post hole diggers, and more.

In a preferred embodiment of the present invention, the present invention operates as follows. Referring to FIGS. 22-27, the preferred method for using the convertible ramp body 120 includes removing and storing the cargo bed extender 122 and ramp 150 separate from the rest of the combination 120. In the first step, the combination 120 is provided positioned about the cargo bed 102 of a vehicle 100, with the storage shelf body 124 positioned on one axial end of the cargo bed 102 and the cargo bed extender 122 positioned proximate to the opposite axial end of the cargo bed 102. The storage shelf body 124 and cargo bed extender 122 are preferably connected on opposite lateral ends of the cargo bed 102 by first and second sidewall beams 126 and 128. Engagement brackets 169 preferably connect the cargo bed extender 122 to the first and second sidewall beams 126, 128. The cargo bed extender 122 is preferably connected to the towing bracket 118 of the vehicle 100 via a towing bracket connector 170. A first turnbuckle 194 is preferably stored on the first sidewall extender 146, preferably being connected to one or more first turnbuckle connector 195. A second turnbuckle 196 is preferably stored on the second sidewall extender 148, preferably being connected to one or more second turnbuckle connector 197. The ramp 150 is preferably connected to the cargo bed extender 122 via at least one pivotal connection 152, and may be secured in the blocking position by a ramp lock 192. The ramp 150 may form a gate for an end of the expanded cargo bed, formed by the cargo bed 102 and the cargo bed extender 122 when the ramp is in the blocking position.

In the second step, the user next rotates the ramp 150 downward such that the free end is lowered to the support surface 188. The ramp 150 may be said to be in a ground contacting position when it has been lowered to contact the transfer surface 188. In this step, the engagement portion of the connector 174 remains connected to the jack assembly 175 via a rack pin 204 which passes through two of the rack openings 202 and through one of the vertical adjustment opening 212. The extendable leg 206 remains stored mostly within the telescoping rod 176 such that the footer 177 is preferably held closer to the bumper 116 than the support surface 188. The first turnbuckle 194 and or second turnbuckle 196 remain positioned on the first and second sidewall extenders 146, 148, respectively.

In the third step, the user next removes the second turnbuckle 196 from its position on the second sidewall extender 148 and connects it to one of the second turnbuckle connectors 197 and second ramp turnbuckle connector 201. This positions the second turnbuckle 196 in the angle formed between the ramp 150 and second sidewall extender 148. The user may then, or alternately may instead, remove the first turnbuckle 194 from its position on the first sidewall extender 146 and connect it to one of the first turnbuckle connectors 195 and the first ramp turnbuckle connector 200. This may position the first turnbuckle 194 in the angle formed between the ramp 150 and first sidewall extender 146. The first turnbuckle 194 and second turnbuckles 196 may then be engaged to lock at the desired length, to keep the angle of the ramp 150 relative to the cargo bed extender 122 from changing.

In the fourth step, the user may then extend the extendable leg 206 from within the telescoping rod 176 until the footer 177 contacts the support surface 188. Preferably, this extension can be driven by the jack assembly 175 by a hand crank or electric motor. Those of ordinary skill in the art will appreciate from this disclosure that any suitable means for driving the extension of the extendable leg 206 may be provided without exceeding the scope of this disclosure.

In the fifth step, the user may remove the rack pin 204 from the rack openings 202 and the vertical adjustment openings 212. The hitch pin 178 preferably remains within the towing bracket 118 and the pin holes 179. In such a configuration, the engagement portion of the connector 174 remains connect to the towing bracket 118 which being disconnected from the rest of the towing bracket connector 170.

In the sixth step, the user preferably then disconnects the engagement brackets 169 from the first and second sidewall beams 126, 128. In some preferred embodiments, such as the one shown in FIG. 26, the engagement brackets 169 may be disconnected by removing bracket pins which may pass through the engagement brackets 169 and the first sidewall beam 126 and/or the second sidewall beam 128 to secure the engagement brackets 169 thereto. In other preferred embodiments, the engagement brackets 169 may be clip-style brackets and so they can be disconnected with limit use of tools. Those of ordinary skill in the art will appreciate from this disclosure that any suitable shape of bracket may be provided.

In the seventh step, the user may then drive the vehicle 100 forward and away from the cargo bed extender 122 and ramp 150. This may separate the cargo bed extender 122 and ramp 150 from the rest of the combination 120, which remains connected to the vehicle.

In some preferred methods, the engagement portion of the connector 174 may be left within the towing bracket 118. In other preferred embodiments, once the vehicle 100 has driven forward, the user may then remove the hitch pin 178 from the pin holes 179 and the towing bracket 118, leaving the engagement portion of the connector 174, the rack pin 204, and the hitch pin 178 all temporarily disconnected from the rest of the combination 120. A user preferably may then position the engagement portion of the connector 174 such that a preferred vertical adjustment opening 212 aligns with a preferred pair of rack openings 202, with the user then inserting the rack pin 204 therethrough. The user may further insert the hitch pin 178 through the pin holes 179 in the engagement portion of the connector 174, thus assembly the combination 120 in two separate pieces. Those of ordinary skill in the art will appreciate from this disclosure that the steps may be performed or omitted in any order without exceeding the scope of this disclosure.

It is recognized by those skilled in the art that changes may be made to the above described methods and structures without departing from the broad inventive concept thereof. It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. A combination of a vehicle and a convertible ramp body, wherein:
   the vehicle comprises a cargo bed about which the convertible ramp body may be positioned;
   the cargo bed comprises a bed floor with a perimeter;
   the convertible ramp body comprises:
      a cargo bed extender is positioned adjacent to the cargo bed:
   a ramp connected to the cargo bed extender by a pivotal connection, allowing the ramp to rotate upward and downward about the pivotal connection,
      wherein the cargo bed extender has a support panel configured to increase an effective area of the cargo bed of the vehicle, wherein when viewed in cross-section the support panel has an arcuate curvature, with first and second support panel ends, the first support panel end being vertically closer to the ground than the second support panel end which is generally positioned a same vertical distance above the ground as the cargo bed of the vehicle.

2. The combination of claim 1, the convertible ramp body further comprising a jack positioned on a side of the support panel which can be extended to contact the ground, wherein when the ramp is fixed relative to the support panel in a ground contacting position and the jack is in contact with the ground the cargo bed extender is supported above the ground by the ramp and the jack.

3. A combination of a vehicle and a convertible ramp body, wherein:
   the vehicle comprises a cargo bed about which the convertible ramp body may be positioned;
   the cargo bed comprises a bed floor with a perimeter;
   the convertible ramp body comprises:
      a cargo bed extender is positioned adjacent to the cargo bed;
      a ramp connected to the cargo bed extender by a pivotal connection, allowing the ramp to rotate upward and downward about the pivotal connection, wherein
   the cargo bed extender further comprises:
      the cargo bed defined by a horizontal sidewall and a bed opening, which does not have a rear gate located therein, positioned on opposite axial ends of the cargo bed and a first lateral sidewall and a second lateral sidewall positioned on opposite lateral ends of the cargo bed, a cargo bed extender frame configured to adjacently underlie a first flooring section and a second flooring section;
      a storage shelf body on one axial end, positioned farther from the bed floor, as measured planar perpendicularly, than the horizontal sidewall;
      the cargo bed extender being positioned on the opposite axial end from the storage shelf body such that the cargo bed extender is positioned adjacent to the bed opening, the cargo bed extender comprising a vertical support portion having a first flooring section and a roll-off portion having a second flooring section, such that the first flooring section increases an effective area of the bed floor and the second flooring section is angled downward relative to the first flooring section and is configured to extend outwardly relative to the cargo bed, no portion of the cargo bed extender is formed by the rear gate of the vehicle;
      a first sidewall beam positioned over the first lateral sidewall and a second sidewall beam positioned over the second lateral sidewall, the cargo bed extender and the storage shelf body being located on opposite ends of the first and second sidewall beams;
      a first sidewall extender extending upward from the cargo bed extender frame to extend the first lateral sidewall outward from the cargo bed;
      a second sidewall extender extending upward from the cargo bed extender frame to extend the second lateral sidewall outward from the cargo bed;
      a towing bracket connector extending downward from the cargo bed extender frame, the towing bracket connector comprising at least one spacer portion and an engagement portion connected to the at least one spacer portion and configured to engage a towing bracket;
      wherein the convertible ramp body does not adjacently overlay nor lay upon any portion of the bed floor when positioned on the cargo bed of the vehicle; and
      wherein the first sidewall beam comprises some of the plurality of securing posts and the second sidewall beam comprises some of the plurality of securing posts, wherein the first and second lateral sidewalls comprise a plurality of sidewall openings configured to receive some of a plurality of securing posts therein, and wherein the plurality of securing posts is inserted into the corresponding plurality of sidewall openings to secure the position of the convertible ramp body about the cargo bed.

4. The combination of claim 3, wherein:
   the vehicle further comprises a bumper positioned proximate to the bed opening and the towing bracket positioned below the bumper;
   wherein the towing bracket connector is connected to the towing bracket such that the first flooring section is positioned roughly above the bumper;
   the at least one spacer portion further comprises a first spacer portion positioned on the cargo bed extender frame opposite the vertical support portion and a second spacer portion positioned on the cargo bed extender frame opposite the roll-off portion.

5. The combination of claim 4, wherein the towing bracket connector is secured within the towing bracket via a pin.

6. The combination of claim 2, wherein the ramp further comprises a ramp frame with a ramp floor positioned thereon, the ramp frame being connected to the pivotal connection, and wherein the convertible ramp body further comprises a ramp lock to secure the ramp in an upward position.

7. The combination of claim 3, wherein the storage shelf body further comprises:
 a shelf frame configured to support the storage shelf body;
 a shelf flooring section positioned roughly parallel to the bed floor and configured to receive handheld tools thereon;
 first and second shelf sidewalls positioned on opposite lateral ends of the storage shelf body;
a horizontal shelf sidewall positioned on an axial end of the storage shelf body opposite the cargo bed; and
 a shelf support arm extending parallel to the horizontal shelf sidewall on an opposite axial end of the storage shelf body closer to the cargo bed, the shelf support arm being vertically shorter than the horizontal shelf sidewall and the first and second shelf sidewalls, wherein the handheld tools placed on the storage shelf body are more likely to fall into the cargo bed if they become dislodged from the shelf flooring section due to the shelf support arm being the shortest of the storage shelf body sidewalls.

8. The combination of claim 7, wherein the shelf frame further comprises:
 a plurality of shelf support posts extending upward to provide vertical support to the shelf flooring section; and
 wherein the shelf frame defines a shelf portion of the first sidewall beam and a shelf portion of the second sidewall beam, and wherein the shelf portion of the first sidewall beam is positioned on the first lateral sidewall and the shelf portion of the second sidewall beam is positioned on the second lateral sidewall.

9. The combination of claim 8, wherein the cargo bed extender frame defines a bed extender portion of the first sidewall beam and a bed extender portion of the second sidewall beam, and wherein the bed extender portion of the first sidewall beam is positioned on the first lateral sidewall and the bed extender portion of the second sidewall beam is positioned on the second lateral sidewall.

10. The combination of claim 9, wherein the convertible ramp body further comprises:
 a plurality of brackets, wherein some of the plurality of brackets connect the shelf portion of first sidewall beam to the first sidewall beam, the first sidewall beam to the bed extender portion of first sidewall beam, the shelf portion of second sidewall beam to the second sidewall beam, and the second sidewall to the bed extender portion of second sidewall beam; and
 a plurality of mounting brackets, wherein some of the plurality of mounting brackets are connected to the shelf portion of first sidewall beam and the shelf portion of second sidewall beam and wherein the plurality of mounting brackets are configured to be connected to at least one of: the first lateral sidewall, the second lateral sidewall, and the horizontal sidewall.

11. The combination of claim 10, wherein the convertible ramp body further comprises at least one of:
 a first sidewall hanging rack, comprising some of a plurality of hooks for hanging handheld tools, being affixed to the first sidewall beam; and
 a second sidewall hanging rack, comprising some of the plurality of hooks for hanging handheld tools, being affixed to the second sidewall beam.

12. A convertible ramp body configured for use with a vehicle having a cargo bed, the cargo bed having a bed floor with a perimeter,
 the convertible ramp body comprises:
 a cargo bed extender positioned adjacent to the cargo bed and configured to increase an effective size of the cargo bed; and
 a ramp connected to the cargo bed extender by a pivotal connection, allowing the ramp to rotate upward and downward about the pivotal connection such that the ramp is moveable between a ground contacting position to extend between the ground and the cargo bed extender and a blocking position such that the ramp forms a gate for an end of the cargo bed, wherein
 the cargo bed extender has a support panel configured to increase an effective area of the cargo bed of the vehicle, wherein when viewed in cross-section the support panel has an arcuate curvature, with first and second support panel ends, the first support panel end being vertically closer to the ground than the second support panel end which is generally positioned a same vertical distance above the ground as the cargo bed of the vehicle.

13. The convertible ramp body of claim 12, the convertible ramp body further comprising a jack positioned on a side of the support panel which can be extended to contact the ground, wherein when the ramp is fixed relative to the support panel in the ground contacting position and the jack is in contact with the ground the cargo bed extender is supported above the ground by the ramp and the jack.

14. A convertible ramp body configured for use with a vehicle having a cargo bed, the cargo bed having a bed floor with a perimeter,
 the convertible ramp body comprises:
 a cargo bed extender positioned adjacent to the cargo bed and configured to increase an effective size of the cargo bed; and
a ramp connected to the cargo bed extender by a pivotal connection, allowing the ramp to rotate upward and downward about the pivotal connection such that the ramp is moveable between a ground contacting position to extend between the ground and the cargo bed extender and a blocking position such that the ramp forms a gate for an end of the cargo bed, wherein
 the convertible ramp body is further configured for use with the cargo bed which is defined by a horizontal sidewall and a bed opening, which does not have a rear gate located therein, positioned on opposite axial ends of the cargo bed, and a first lateral sidewall and a second lateral sidewall positioned on opposite lateral ends of the cargo bed, the convertible ramp body further comprises:
 a storage shelf body on one axial end, positioned farther from the bed floor, as measured planar perpendicularly, than the horizontal sidewall;
 the cargo bed extender being positioned on the opposite axial end from the storage shelf body such that the cargo bed extender is positioned adjacent to the bed opening, the cargo bed extender comprising a vertical support portion having a first flooring section and a roll-off portion having a second flooring section, such that the first flooring section increases an effective area of the cargo bed and the second flooring section is angled downward relative to the first flooring section and is configured to extend outwardly relative to the cargo bed, no portion of the cargo bed extender is formed by the rear gate of the vehicle;

a first sidewall beam and a second sidewall beam each connecting the storage shelf body to the cargo bed extender, the first sidewall beam configured to be positioned along the first lateral sidewall and the second sidewall beam configured to be positioned along the second lateral sidewall, the cargo bed extender and the storage shelf body being located on opposite ends of the first and second sidewall beams;

a cargo bed extender frame configured to adjacently underlie the first flooring section and the second flooring section;

a first sidewall extender configured to extend upward from the cargo bed extender frame and outward away from the first lateral sidewall of the cargo bed;

a second sidewall extender configured to extend upward from the cargo bed extender frame outward away from the second lateral sidewall of the cargo bed;

a towing bracket connector extending downward from the cargo bed extender frame, the towing bracket connector comprising at least one spacer portion and an engagement portion connected to the at least one spacer portion and configured to engage a towing bracket positioned proximate to the bed opening;

the convertible ramp body is configured to not adjacently overlay nor lay upon any portion of the bed floor when positioned on the cargo bed of the vehicle;

wherein the first sidewall beam comprises some of a plurality of securing posts and the second sidewall beam comprises some of the plurality of securing posts, the plurality of securing posts being configured to be inserted into a plurality of sidewall openings in the first lateral sidewall or second lateral sidewall of the cargo bed;

the ramp further comprises a ramp frame with a ramp floor positioned thereon, the ramp frame being connected to the pivotal connection to allow the ramp to rotate about the pivotal connection, the ramp frame being configured such that it is at least as wide as the cargo bed extender frame such that the ramp cannot rotate past the cargo bed extender, and wherein the convertible ramp body further comprises a ramp lock to secure the ramp in an upward position; the convertible ramp body further comprising:

a shelf frame;

a shelf flooring section positioned roughly parallel to the bed floor and configured to receive handheld tools thereon;

first and second shelf sidewalls positioned on opposite lateral ends of the storage shelf body and a horizontal shelf sidewall positioned on an axial end of the storage shelf body opposite the cargo bed, ensuring that handheld tools placed on the storage shelf body can only fall into the cargo bed if they become dislodged from the shelf flooring section;

the shelf frame further comprises a plurality of shelf support posts extending upward to provide vertical support to the shelf flooring section and a shelf support arm extending laterally from the plurality of shelf support posts;

the storage shelf body is configured such that the horizontal shelf sidewall is positioned above the horizontal sidewall of the cargo bed and wherein the shelf support arm is configured such that the shelf support arm and a portion of the shelf flooring section held thereon are positioned directly above a portion of the bed floor and being located farther from the bed floor, as measured planar perpendicularly, than any of the horizontal sidewall, the first lateral sidewall, and the second lateral sidewall.

15. A cargo bed extender configured for increasing the effective area of a cargo bed of a vehicle to provide an expanded cargo bed, comprising:

a support panel configured to be attached to the vehicle and to be positioned adjacent to and in general edge-to-edge alignment with the cargo bed of the vehicle;

a ramp connected to the support panel of the cargo bed extender by a pivotal connection, allowing the ramp to rotate upward and downward about the pivotal connection such that the ramp is moveable between a ground contacting position to extend between the ground and the support panel and a blocking position such that the ramp forms a gate for an end of the expanded cargo bed, wherein when in the ground contacting position the ramp can be positionally fixed relative to the support panel such that the ramp forms at least one support structure for the cargo bed extender; and a jack positioned on a side of the support panel which can be extended to contact the ground, wherein when the ramp is fixed relative to the support panel in the ground contacting position and the jack is in contact with the ground the cargo bed extender is supported above the ground by the ramp and the jack;

wherein when viewed in cross-section the support panel has an arcuate curvature, with first and second support panel ends, the first support panel end being closer to the ground than the second support panel end which is generally positioned a same vertical distance above the ground as the cargo bed of the vehicle.

16. The cargo bed extender of claim 15, wherein the height of the support panel is generally unchanged whether the support panel is engaged with a vehicle or freestanding.

* * * * *